US008293416B2

(12) United States Patent
Kobayashi et al.

(10) Patent No.: US 8,293,416 B2
(45) Date of Patent: Oct. 23, 2012

(54) FUEL CELL SYSTEM

(75) Inventors: Susumu Kobayashi, Nara (JP); Susumu Hatano, Shiga (JP)

(73) Assignee: Panasonic Corporation, Osaka (JP)

( * ) Notice: Subject to any disclaimer, the term of this patent is extended or adjusted under 35 U.S.C. 154(b) by 867 days.

(21) Appl. No.: 12/298,421

(22) PCT Filed: Apr. 25, 2007

(86) PCT No.: PCT/JP2007/058922
§ 371 (c)(1),
(2), (4) Date: Oct. 24, 2008

(87) PCT Pub. No.: WO2007/125945
PCT Pub. Date: Nov. 8, 2007

(65) Prior Publication Data
US 2009/0098425 A1 Apr. 16, 2009

(30) Foreign Application Priority Data
Apr. 25, 2006 (JP) ................................. 2006-120894

(51) Int. Cl.
H01M 8/04 (2006.01)
(52) U.S. Cl. ......... 429/434; 429/428; 429/433; 429/440
(58) Field of Classification Search .................... 429/433
See application file for complete search history.

(56) References Cited

U.S. PATENT DOCUMENTS 6,280,864 B1 * 8/2001 Towler et al. .................. 429/412
6,365,291 B1 * 4/2002 Margiott ........................ 429/414
2002/0119356 A1 8/2002 Shimanuki et al.
2003/0162065 A1 8/2003 Miyauchi et al.
2003/0189416 A1 10/2003 Scholta et al.
(Continued)

FOREIGN PATENT DOCUMENTS
CN 1463474 A 12/2003
(Continued)

OTHER PUBLICATIONS

International Search Report issued in International Application No. PCT/JP2007/058922 dated on Jun. 29, 2007.
(Continued)

Primary Examiner — Ula C Ruddock
Assistant Examiner — Patricia Davis
(74) Attorney, Agent, or Firm — McDermott Will & Emery LLP

(57) ABSTRACT

A fuel cell system includes at least: a hydrogen generator (4) which is supplied with a raw material to generate a fuel gas containing hydrogen; a humidifier (5) which is supplied with the fuel gas, generated in the hydrogen generator, to humidify the fuel gas by utilizing heat energy and an off gas supplied thereto; and a fuel cell (8) which is supplied with the fuel gas humidified in the humidifier and an oxidizing gas to generate electric power while discharging the heat energy and the off gas, and further includes a condenser (6) which cools down steam of the off gas, discharged from the fuel cell, by heat exchange with a cooling medium to convert the steam into condensed water, and supplies the condensed water to the humidifier to humidify the fuel cell. With this, the present invention provides a durable, reliable, and cheap fuel cell system capable of adequately and surely humidifying the fuel gas supplied to a polymer electrolyte fuel cell by a simple configuration using the humidifier without disposing a particular exclusive auxiliary device.

8 Claims, 9 Drawing Sheets

U.S. PATENT DOCUMENTS

| | | | |
|---|---|---|---|
| 2003/0190513 A1* | 10/2003 | Meissner et al. | 429/26 |
| 2005/0048338 A1* | 3/2005 | Kobayashi et al. | 429/26 |
| 2005/0074640 A1* | 4/2005 | Hori et al. | 429/13 |
| 2006/0246325 A1 | 11/2006 | Miyauchi et al. | |
| 2009/0176138 A1 | 7/2009 | Miyauchi et al. | |

FOREIGN PATENT DOCUMENTS

| | | |
|---|---|---|
| CN | 1599112 | 3/2005 |
| JP | 6-118149 | 4/1994 |
| JP | 07-226222 | 8/1995 |
| JP | 2001-325982 | 11/2001 |
| JP | 2002-216816 | 8/2002 |
| JP | 2003-045471 | 2/2003 |
| JP | 2004-111268 | 1/2004 |
| JP | 2004-518265 | 6/2004 |
| JP | 2004-281245 | 10/2004 |
| JP | 2005-108529 | 4/2005 |

OTHER PUBLICATIONS

English Translation of Chinese Office Action issued in Chinese Patent Application No. 200780015203.6, mailed May 26, 2010.

* cited by examiner

FUEL CELL SYSTEM

RELATED APPLICATIONS

This application is the U.S. National Phase under 35 U.S.C. §371 of International Application No. PCT/JP2007/058922, filed on Apr. 25, 2007, which in turn claims the benefit of Japanese Application No. 2006-120894, filed on Apr. 25, 2006, the disclosures of which Applications are incorporated by reference herein.

TECHNICAL FIELD

The present invention relates to a fuel cell system including a polymer electrolyte fuel cell which uses a fuel gas and an oxidizing gas to generate electric power.

BACKGROUND ART

As a distributed electric power generator capable of effectively utilizing energy, a fuel cell cogeneration system (hereinafter simply referred to as "fuel cell system") having high power generation efficiency and high overall efficiency has been attracting attention. The fuel cell system includes a fuel cell that is a component as a main body of a power generating portion, and additional components other than the fuel cell. Generally, the entire electric power generator including these components is collectively called a fuel cell system.

The fuel cell system includes a stack-type fuel cell (commonly known as a "stack", and hereinafter simply referred to as a "fuel cell"), which is a component as the main body of the power generating portion. In the fuel cell, a predetermined number of unit cells (commonly known as a "cell") are stacked. Examples of the fuel cell are a phosphoric acid fuel cell, a molten carbonate fuel cell, an alkali aqueous solution fuel cell, a polymer electrolyte fuel cell, and a solid electrolyte fuel cell. Among these fuel cells, operating temperatures of the phosphoric acid fuel cell and the polymer electrolyte fuel cell (abbreviated as PEFC) during an electric power generating operation are comparatively lower than those of the other fuel cells. Therefore, the phosphoric acid fuel cell or the polymer electrolyte fuel cell is typically used as the fuel cell constituting the fuel cell system. Especially, in the case of the polymer electrolyte fuel cell, an electrode catalyst does not deteriorate so much, and dispersion of polymer electrolytes does not occur as compared with the phosphoric acid fuel cell. Therefore, the polymer electrolyte fuel cell is especially preferably used in applications, such as mobile electronic devices and electric cars.

The polymer electrolyte fuel cell uses hydrogen in the electric power generating operation. However, generally, means for supplying hydrogen is not developed as an infrastructure. Therefore, in order to obtain predetermined electric power by the fuel cell system including the polymer electrolyte fuel cell, hydrogen needs to be generated at an installation location of the fuel cell system. On this account, in a conventional fuel cell system, a hydrogen generator is typically disposed with the fuel cell. The hydrogen generator uses water, and a hydrocarbon based material, such as a natural gas, a propane gas, naphtha, gasoline, and kerosene, or an alcohol based material, such as methanol, to generate a fuel gas containing hydrogen by, for example, a steam-reforming reaction. The polymer electrolyte fuel cell is supplied with hydrogen contained in the fuel gas and oxygen contained in the oxidizing gas, such as air, to output predetermined electric power.

In the electric power generating operation of the fuel cell system including the polymer electrolyte fuel cell, the polymer electrolyte fuel cell is supplied with the fuel gas and the oxidizing gas, each of which is humidified so as to have a predetermined dew point. Especially, in consideration of the life of the polymer electrolyte fuel cell, it is desirable that the polymer electrolyte fuel cell be supplied with the fuel gas and the oxidizing gas, each of which is humidified so as to have a dew point that is higher than a temperature of a predetermined region of the polymer electrolyte fuel cell to which region the fuel gas and the oxidizing gas are initially introduced. As above, since the polymer electrolyte fuel cell is supplied with the fuel gas and the oxidizing gas, each of which is humidified so as to have the predetermined dew point, or the fuel gas and the oxidizing gas, each of which is humidified so as to have the dew point that is higher than the temperature of the predetermined region, the electric power generating operation of the polymer electrolyte fuel cell is preferably carried out in the fuel cell system.

Generally, in the fuel cell system designed such that the oxidizing gas (hereinafter simply referred to as "off air") discharged from the polymer electrolyte fuel cell has an adequate exhaust enthalpy, the oxidizing gas supplied to the polymer electrolyte fuel cell is easily and surely humidified up to a predetermined dew point by total enthalpy heat exchange with the off air in a total enthalpy heat exchanger.

Meanwhile, in the fuel cell system including the hydrogen generator, since a part of water added when causing the steam-reforming reaction to proceed remains in the fuel gas as steam, the fuel gas discharged from the hydrogen generator is being automatically humidified up to a certain degree. Therefore, as long as operating conditions of the hydrogen generator and operating conditions of the polymer electrolyte fuel cell adapt to each other, the fuel gas generated by the hydrogen generator can be directly supplied to the polymer electrolyte fuel cell without disposing a particular humidifier. However, in order to increase the efficiency of the steam-reforming reaction, it is desirable that the amount of water to be added be reduced in such a range that carbon deposition is not induced, and thereby latent heat of vaporization, of which a reaction system of the steam-reforming reaction is deprived, be reduced. In this case, since the amount of water to be added is reduced, the fuel gas may not be humidified up to a predetermined dew point in the hydrogen generator depending on the operating conditions of the polymer electrolyte fuel cell. Therefore, in the fuel cell system including the hydrogen generator, generally, a humidifier is separately disposed, which surely humidifies the fuel gas up to a predetermined dew point. The humidifier allows the fuel gas generated in the hydrogen generator to be surely humidified up to a predetermined dew point in the fuel cell system.

However, in the fuel cell system including the hydrogen generator, unlike the configuration of humidifying the oxidizing gas, it is very difficult to supply the fuel gas (hereinafter simply referred to as an "off gas"), discharged from the polymer electrolyte fuel cell, to the total enthalpy heat exchanger to humidify the fuel gas, generated in the hydrogen generator by the total enthalpy heat exchange, up to a predetermined dew point, even if the off gas has an adequate exhaust enthalpy. This is because when comparing the flow rates of the off gas and the off air discharged from the polymer electrolyte fuel cell in the electric power generating operation, the flow rate of the off gas is significantly lower than that of the off air.

More specifically, the operating temperature of a common polymer electrolyte fuel cell is about 60 to 80° C., and especially in the case of a cogeneration application, generally, the amount of cooling water to be supplied to the polymer electrolyte fuel cell is controlled such that a temperature difference between the cooling water supplied to the polymer electrolyte fuel cell and the cooling water discharged therefrom is about 10° C.

In this case, assuming that an oxygen utilization ratio (abbreviated as Uo) of the polymer electrolyte fuel cell is 50%, a molar flow rate of the off air discharged from the polymer electrolyte fuel cell is 90% of a molar flow rate of the oxidizing gas supplied thereto. That is, in a process of humidifying the oxidizing gas, the off air of the adequate temperature and flow rate is supplied to the total enthalpy heat exchanger. Therefore, in a case where the temperature of the off air discharged from the polymer electrolyte fuel cell is 70° C. for example, adjusting the dew point of the oxidizing gas to 60° C. by the total enthalpy heat exchange utilizing the off air of 70° C. is easily and surely achieved by using the total enthalpy heat exchanger designed appropriately.

However, as described above, it is very difficult to humidify the fuel gas up to a predetermined dew point by the total enthalpy heat exchange using the off gas. This is because since, generally, the fuel gas generated in the hydrogen generator is a mixture gas of hydrogen and carbon dioxide showing a ratio of about 8 to 2, and a fuel utilization ratio (abbreviated as Uf) of the polymer electrolyte fuel cell is about 80%, the molar flow rate of the off gas discharged from the polymer electrolyte fuel cell becomes about 40% of the molar flow rate of the fuel gas supplied thereto. That is, in the process of humidifying the fuel gas, an adequate flow rate of off gas (adequate amount of heat) is not supplied to the total enthalpy heat exchanger. Therefore, the fuel gas is not heated adequately. Therefore, even if the temperature of the off gas discharged from the polymer electrolyte fuel cell is 70° C., adjusting the dew point of the fuel gas to 60° C. by the total enthalpy heat exchange utilizing the off gas of 70° C. is very difficult even by using the total enthalpy heat exchanger designed appropriately.

Instead of the configuration of humidifying the fuel gas using the off gas as a heat source, a fuel cell system has been proposed, which humidifies the fuel gas using as the heat source the cooling water discharged from the fuel cell and increased in temperature (see Patent Document 1 for example).

In this conventional proposal, the cooling water discharged from the fuel cell and increased in temperature is utilized as the heat source when humidifying the fuel gas. Specifically, the cooling water discharged from the fuel cell and increased in temperature is supplied to the humidifier, and the off gas discharged from the fuel cell is supplied to the humidifier. Therefore, in the humidifier, the fuel gas generated in the hydrogen generator is adequately heated, and the off gas supplied to the humidifier is adequately heated. Thus, the fuel gas is humidified adequately.

Hereinafter, the configuration of a fuel cell system which humidifies the fuel gas using as the heat source the cooling water discharged from the fuel cell and increased in temperature will be outlined.

FIG. 9 is a block diagram schematically showing a part of a typical configuration of a conventional stationary power generating fuel cell system which humidifies the fuel gas using as the heat source the cooling water discharged from the fuel cell and increased in temperature. In FIG. 9, each of solid lines having arrows denotes a connection state between components in the fuel cell system and a flow direction of the fuel gas, the oxidizing gas, primary cooling water, or secondary cooling water in the electric power generating operation.

As shown in FIG. 9, a conventional fuel cell system 500 includes: an oxidizing gas supplying and discharging system including a blower 101, a total enthalpy heat exchanger 102, and a condenser 103; a fuel gas supplying and discharging system including a hydrogen generator 104 having a heater 104a, a humidifier 105 having a beater 105a, and a condenser 106; and a fuel cell 107 which is supplied with the humidified oxidizing gas and fuel gas from the total enthalpy heat exchanger 102 of the oxidizing gas supplying and discharging system and the humidifier 105 of the fuel gas supplying and discharging system to generate electric power.

Moreover, as shown in FIG. 9, the conventional fuel cell system 500 includes: a primary cooling water supplying and discharging system including a cooling water tank 108, a pump 109, the heater 105a, and a heat exchanger 110 for controlling temperatures of the fuel cell 107 and the humidifier 105; and a secondary cooling water supplying and discharging system including a cooling water tank 111, a pump 112, the condenser 103, the condenser 106, the heat exchanger 110, and a heat radiator 113 for controlling temperatures of the off air, the off gas, and primary cooling water discharged from the total enthalpy heat exchanger 102 or the humidifier 105.

To be specific, the conventional fuel cell system 500 includes the fuel cell 107 that is the component as the main body of the power generating portion, and the oxidizing gas supplying and discharging system, the fuel gas supplying and discharging system, the primary cooling water supplying and discharging system, the secondary cooling water supplying and discharging system, and the like that are the additional components other than the fuel cell 107.

In accordance with the conventional fuel cell system 500, when humidifying the fuel gas generated in the hydrogen generator 104, the cooling water discharged from the fuel cell 107 and increased in temperature is supplied to the heater 105a of the humidifier 105. The heater 105a adequately heats the humidifier 105. Therefore, since the heater 105a adequately heats the humidifier 105 even when the flow rate of the off gas discharged from the fuel cell 107 is low, the fuel gas supplied from the hydrogen generator 104 to the humidifier 105 is adequately heated. Also, the off gas supplied from the fuel cell 107 to the humidifier 105 is adequately heated. Therefore, the fuel gas supplied from the hydrogen generator 104 to the humidifier 105 is adequately humidified. Note that condensed water collected by the condenser 103 and the condenser 106 is purified through a predetermined purifying step, and is used as the cooling water or the like.

As the other fuel cell system which humidifies the fuel gas using as the heat source the cooling water discharged from the fuel cell and increased in temperature, a fuel cell system is proposed, in which water is directly poured into the humidifier, the poured water is heated by the cooling water discharged from the fuel cell and increased in temperature, and thereby the fuel gas is humidified. Since the fuel gas generated in the hydrogen generator is adequately humidified in the humidifier in the fuel cell system, the electric power generating operation of the fuel cell is preferably carried out (see Patent Documents 2 and 3 for example).

Patent Document 1: Japanese Laid-Open Patent Application Publication 2002-216816

Patent Document 2: Japanese Patent Application HEI 6-118149

Patent Document 3: Japanese Laid-Open Patent Application Publication HEI 7-226222

DISCLOSURE OF THE INVENTION

Problems to be Solved by the Invention

However, in the conventional fuel cell system of Patent Document 1, since the humidifier is heated by the heater and is supplied with a comparatively high temperature fuel gas from the hydrogen generator in the electric power generating operation, condensation of the steam contained in the off gas is less likely to proceed in the humidifier, or the condensation (capillary condensation) of the steam does not practically proceed. Therefore, in the conventional fuel cell system, water available to humidify the fuel gas in the humidifier is only a liquid portion of the off gas (generally, the off gas is a two-layer fluid, and the water is a liquid portion of the two-layer fluid). In other words, in accordance with the configuration of the conventional fuel cell system, it is difficult to utilize steam contained in a gas portion of the off gas in order to humidify the fuel gas.

In the conventional fuel cell system, generally, the dew point of the fuel gas generated in the hydrogen generator changes in a range of about ±5° C. In this case, if the dew point of the fuel gas generated in the hydrogen generator is low, the amount of the liquid portion of the off gas discharged from the fuel cell decreases accordingly. Therefore, in the conventional fuel cell system, the water available to humidify the fuel gas lacks in the humidifier in some cases.

To be specific, in the conventional fuel cell system, since the water available to humidify the fuel gas lacks in some cases even when the humidifier is adequately heated by the cooling water discharged from the fuel cell and increased in temperature, the fuel gas generated in the hydrogen generator cannot be adequately humidified in the humidifier in some cases. In addition, since the dew point of the fuel gas supplied is low, this adversely affects the life of the fuel cell in some cases.

In accordance with the conventional fuel cell system of Patent Document 2 or 3, in the case of a small-scale domestic use fuel cell system whose output power is about 1 Kw, since the amount of water poured into the humidifier is about several grams per minute, an extremely small capacity feed-water pump (that is, an exclusive auxiliary device) is required. The extremely small capacity feed-water pump is prohibitively expensive. In addition, the extremely small capacity feed-water pump tends to cause failures, such as clogging of a flow passage. Therefore, it is difficult to provide the fuel cell system at a low price, and to surely secure reliability of the fuel cell system.

The present invention was made to solve the above problems, and an object of the present invention is to provide a durable, reliable, and cheap fuel cell system which is capable of adequately and surely humidifying the fuel gas supplied to the polymer electrolyte fuel cell by a simple configuration including the humidifier without disposing a particular exclusive auxiliary device.

Means for Solving the Problems

To solve the above conventional problems, a fuel cell system according to the present invention includes at least: a hydrogen generator which is supplied with a raw material to generate a fuel gas containing hydrogen; a humidifier which is supplied with the fuel gas, generated in the hydrogen generator, to humidify the fuel gas by utilizing heat energy and an off gas supplied thereto; and a fuel cell which is supplied with the fuel gas humidified in the humidifier and an oxidizing gas to generate electric power while discharging the heat energy and the off gas, and the fuel cell system further includes a condenser which converts steam of the off gas, discharged from said fuel cell, into condensed water by cooling down the steam by heat exchange with a cooling medium, and supplies the condensed water to the humidifier to humidify the fuel gas.

In accordance with this configuration, in addition to liquid water contained in the off gas and available to humidify the fuel gas, the condensed water obtained by condensing the steam contained in the off gas can be utilized to humidify the fuel gas. Therefore, in the electric power generating operation of the fuel cell system, it is possible to surely supply to the fuel cell the fuel gas humidified adequately and having a predetermined dew point.

In the above case, the fuel cell system further includes a primary cooling water supplying and discharging system which causes primary cooling water to flow through an inside of the fuel cell to directly control a temperature of the fuel cell, and the fuel cell system is configured to use as the cooling medium the primary cooling water in the primary cooling water supplying and discharging system.

In accordance with this configuration, the primary cooling water in the primary cooling water supplying and discharging system is used as the cooling medium. Therefore, it is possible to efficiently generate in the condenser the condensed water available to humidify the fuel gas.

Moreover, in the above case, the fuel cell system further includes a secondary cooling water supplying and discharging system which causes primary cooling water of the primary cooling water supplying and discharging system to transfer heat to secondary cooling water to indirectly control a temperature of the fuel cell, and the fuel cell system is configured to use as the cooling medium the secondary cooling water in the secondary cooling water supplying and discharging system.

In accordance with this configuration, the secondary cooling water in the secondary cooling water supplying and discharging system is used as the cooling medium. Therefore, it is possible to further efficiently generate in the condenser the condensed water available to humidify the fuel gas.

Moreover, in the above case, the fuel cell system further includes an air introducing device which introduces air from an outside of the fuel cell system to an inside of the fuel cell system, and the fuel cell system is configured to use as the cooling medium the air introduced to the inside of the fuel cell system by the air introducing device.

In accordance with this configuration, the air of the outside of the fuel cell system is used as the cooling medium. Therefore, it is possible to efficiently generate in the condenser the condensed water available to humidify the fuel gas without affecting operations of the fuel cell system.

Moreover, in the above case, the fuel cell system is configured to use air of an inside of the fuel cell system as the cooling medium.

In accordance with this configuration, the air of the inside of the fuel cell system is used as the cooling medium. Therefore, it is possible to efficiently and easily generate in the condenser the condensed water available to humidify the fuel gas without affecting the operations of the fuel cell system. This configuration includes a component which cools down the steam of the off gas, discharged from the fuel cell, by the heat exchange with the air as the cooling medium without using a cooling mechanism, such as a heat radiating fin and a cooling fan, to convert the steam into the condensed water. To be specific, this configuration includes a component in which an off gas passage (returning pipe) through which the off gas discharged from the fuel cell flows functions as the condenser.

Moreover, in the above case, the fuel cell system is configured such that the condensed water is automatically supplied from the condenser toward the humidifier by gravitational force.

In accordance with this configuration, the condensed water forcibly generated in the condenser is automatically supplied to the humidifier by the gravitational force. Therefore, it is possible to surely supply the condensed water from the condenser toward the humidifier by a simple configuration without disposing a particular feed-water device.

Moreover, in the above case, the condenser and the humidifier are integrated with each other to constitute a condensing and humidifying device.

In accordance with this configuration, the condenser and the humidifier are integrated with each other to constitute the condensing and humidifying device. Therefore, it is possible to comparatively miniaturize a humidifying component which humidifies the fuel gas such that the fuel gas has a predetermined dew point. With this, it is possible to effectively prevent the fuel cell system from increasing in size.

Further, in the above case, the fuel cell system further includes as the fuel cell a polymer electrolyte fuel cell which is supplied with the fuel gas and the oxidizing gas to generate the electric power.

In accordance with this configuration, in the fuel cell system including the polymer electrolyte fuel cell, the fuel gas adequately humidified and having a predetermined dew point can be supplied to the polymer electrolyte fuel cell in the electric power generating operation.

Effects of the Invention

The present invention is carried out by the above-described means, and has an effect of being able to provide a durable, reliable, and cheap fuel cell system which is capable of adequately and surely humidifying the fuel gas supplied to the polymer electrolyte fuel cell by a simple configuration including the humidifier without disposing a particular exclusive auxiliary device.

BRIEF DESCRIPTION OF THE DRAWINGS

FIG. 4($b$) shows a correlation in a case where the water available to optimize the dew point of the fuel gas is increased in the condensing portion of the condensing and humidifying device.

FIG. 6($b$) shows a correlation in a case where the water available to optimize the dew point of the fuel gas is increased in the condensing portion of the condensing and humidifying device.

Figure 1:
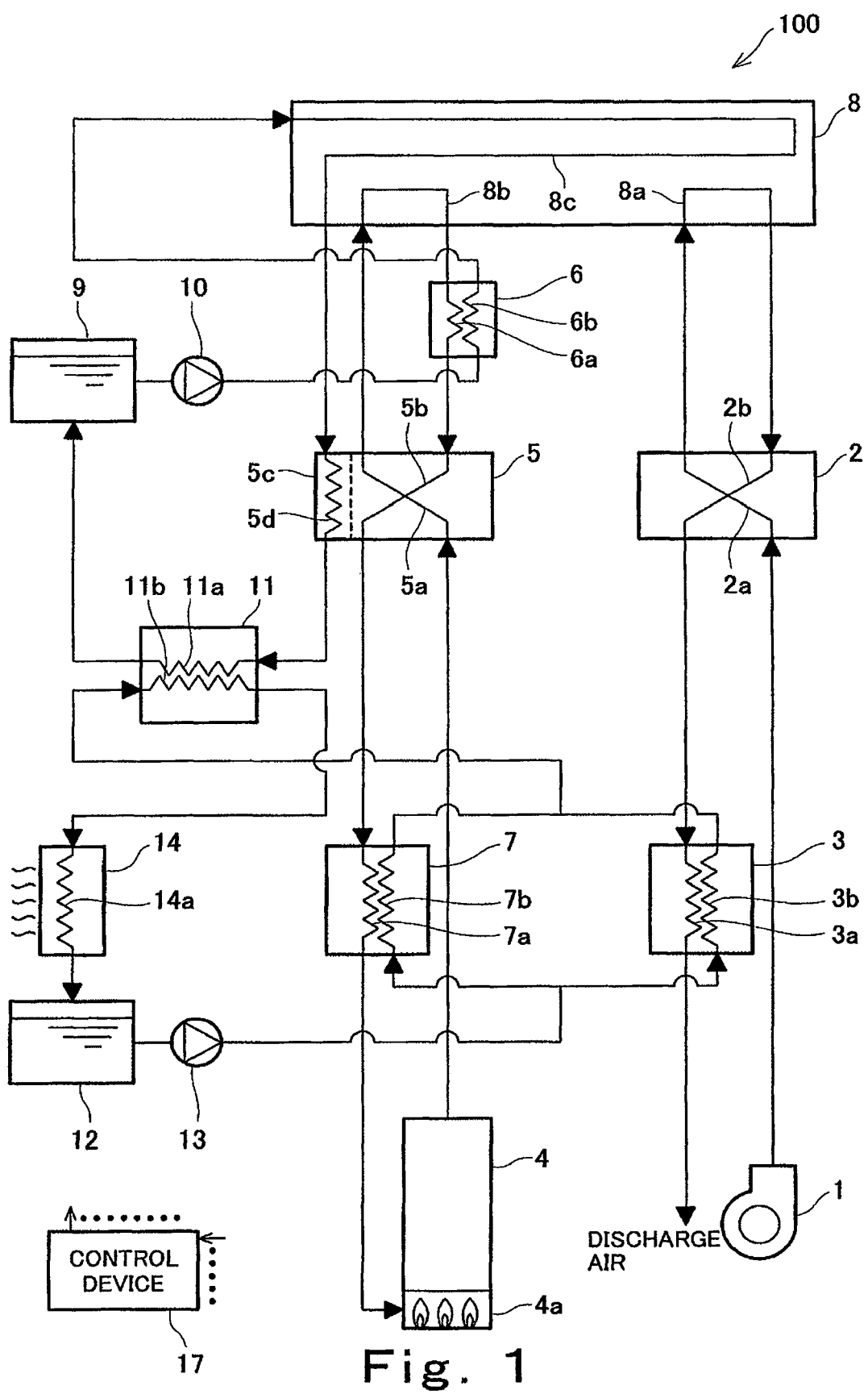
FIG. 1 is a block diagram schematically showing a part of the configuration of a fuel cell system according to Embodiment 1 of the present invention.

EXPLANATION OF REFERENCE NUMBERS 1 blower
2 total enthalpy heat exchanger
2$a$ outward route
2$b$ return route
3 condenser
3$a$ off air passage
3$b$ secondary cooling water passage
4 hydrogen generator
4$a$ heater
5 humidifier
5$a$ outward route
5$b$ return route
6 condenser
6$a$ off gas passage
6$b$ primary cooling water passage
7 condenser
7$a$ off gas passage
7$b$ secondary cooling water passage
8 polymer electrolyte fuel cell
8$a$ oxidizing gas passage
8$b$ fuel gas passage
8$c$ primary cooling water passage
9 primary cooling water tank
10 pump
11 heat exchanger
11$a$ primary cooling water passage
11$b$ secondary cooling water passage
12 secondary cooling water tank
13 pump
14 heat radiator
14$a$ secondary cooling water passage
15 second blower
16 condenser
16$a$ heat radiating fin
16$b$ off gas passage
17 control device
20 end plate
20$a$ to 20$c$ inlet port
20$d$ outlet port
21 condensing plate
21$a$, 21$b$ concave portion
21$c$ to 21$e$ through hole
22 insulating plate
22$c$, 22$d$ through hole
23 first heating plate
23$a$, 23$b$ concave portion
23$c$, 23$d$ through hole
24 humidifying membrane
24$c$, 24$d$ through hole
25 second heating plate 25a, 25b concave portion
25c, 25d through hole
26 end plate
30 condensing and humidifying device
30a condensing portion
30b humidifying portion
101 blower
102 total enthalpy heat exchanger
103 condenser
104 hydrogen generator
104a heater
105 humidifier
105a heater
106 condenser
107 fuel cell
108 cooling water tank
109 pump
110 heat exchanger
111 cooling water tank
112 pump
113 heat radiator
100 to 500 fuel cell system

BEST MODE FOR CARRYING OUT THE
INVENTION

Hereinafter, the best mode for carrying out the present invention will be explained in detail in reference to the drawings.

In the present invention, an off gas discharged from a polymer electrolyte fuel cell is forcibly cooled down in a condenser, thereby forcibly converting steam contained in the off gas into condensed water. By the condensation of the steam, water available to humidify a fuel gas, i.e., a liquid portion of the off gas is forcibly increased. With this, lack of the water available to humidify the fuel gas generated in a hydrogen generator is surely resolved by a simple, durable, reliable, and cheap configuration.

Embodiment 1

In Embodiment 1 of the present invention, primary cooling water flowing through a primary cooling water supplying and discharging system is utilized as a medium for cooling (hereinafter simply referred to as a "cooling medium"), thereby forcibly cooling down in the condenser the off gas discharged from the polymer electrolyte fuel cell. Thus, the water available to humidify the fuel gas is forcibly increased.

First, the configuration of a fuel cell system according to Embodiment 1 of the present invention will be explained.

FIG. 1 is a block diagram schematically showing a part of the configuration of the fuel cell system according to Embodiment 1 of the present invention. In FIG. 1, each of solid lines having arrows denotes a connection state between components in the fuel cell system and a flow direction of the fuel gas, an oxidizing gas, the primary cooling water, or secondary cooling water in an electric power generating operation. In the following explanation, for convenience sake, a heat exchanger and the condenser belong to both one supplying and discharging system and the other supplying and discharging system.

As shown in FIG. 1, a fuel cell system 100 according to Embodiment 1 of the present invention includes a blower 1, a total enthalpy heat exchanger 2, and a condenser 3. The blower 1 receives the oxidizing gas (i.e., air) from an inlet port thereof and discharges the oxidizing gas from an outlet port thereof. The total enthalpy heat exchanger 2 carries out a total enthalpy heat exchange between the oxidizing gas supplied to an outward route 2a and off air supplied to a return route 2b. The condenser 3 carries out a heat exchange between the off air supplied to an off air passage 3a and the secondary cooling water supplied to a secondary cooling water passage 3b.

In the fuel cell system 100 according to the present embodiment, the outlet port of the blower 1 and a first end of the outward route 2a of the total enthalpy heat exchanger 2 are connected to each other by a predetermined pipe, and a second end of the outward route 2a of the total enthalpy heat exchanger 2 and a first end of an oxidizing gas passage 8a of a polymer electrolyte fuel cell 8 are connected to each other by a predetermined pipe. Moreover, in the fuel cell system 100, a second end of the oxidizing gas passage 8a of the polymer electrolyte fuel cell 8 and a first end of the return route 2b of the total enthalpy heat exchanger 2 are connected to each other by a predetermined pipe, and a second end of the return route 2b of the total enthalpy heat exchanger 2 and a first end of the off air passage 3a of the condenser 3 are connected to each other by a predetermined pipe. Further, a second end of the off air passage 3a of the condenser 3 is connected to a first end of a predetermined pipe having an opening end. Thus, an oxidizing gas supplying and discharging system is configured in the fuel cell system 100.

As shown in FIG. 1, the fuel cell system 100 according to Embodiment 1 includes a hydrogen generator 4 having a heater 4a, a humidifier 5 having a heater 5c, a condenser 6, and a condenser 7. The heater 4a burns supplied combustion fuel to generate heat energy which causes a steam-reforming reaction to proceed in the hydrogen generator 4. The hydrogen generator 4 uses water, and a hydrocarbon based material, such as a natural gas, a propane gas, naphtha, gasoline, and kerosene, or an alcohol based material, such as methanol, to generate a fuel gas containing hydrogen through the steam-reforming reaction. The humidifier 5 utilizes the off gas (liquid portion of the two-layer fluid that is the off gas), supplied to a return route 5b, to humidify the fuel gas supplied to an outward route 5a. The condenser 6 cools down the off gas, supplied to an off gas passage 6a, by the primary cooling water, supplied to a primary cooling water passage 6b, to convert the steam contained in the off gas into the condensed water. The condenser 7 carries out the heat exchange between the off gas supplied to an off gas passage 7a and the secondary cooling water supplied to a secondary cooling water passage 7b.

In the fuel cell system 100 according to the present embodiment, a fuel gas outlet port of the hydrogen generator 4 and a first end of the outward route 5a of the humidifier 5 are connected to each other by a predetermined pipe, and a second end of the outward route 5a of the humidifier 5 and a first end of a fuel gas passage 8b of the polymer electrolyte fuel cell 8 are connected to each other by a predetermined pipe. Moreover, in the fuel cell system 100, a second end of the fuel gas passage 8b of the polymer electrolyte fuel cell 8 and a first end of the off gas passage 6a of the condenser 6 are connected to each other by a predetermined pipe, and a second end of the off gas passage 6a of the condenser 6 and a first end of the return route 5b of the humidifier 5 are connected to each other by a predetermined pipe. Further, in the fuel cell system 100, a second end of the return route 5b of the humidifier 5 and a first end of the off gas passage 7a of the condenser 7 are connected to each other by a predetermined pipe, and a second end of the off gas passage 7a of the condenser 7 and a combustion fuel inlet port of the heater 4a are connected to each other by a predetermined pipe. Thus, a fuel gas supplying and discharging system is configured in the fuel cell system 100.

As shown in FIG. 1, the fuel cell system 100 according to Embodiment 1 includes the polymer electrolyte fuel cell 8 as a main body of a power generating portion thereof. In the electric power generating operation, the polymer electrolyte fuel cell 8 uses the oxidizing gas supplied to the oxidizing gas passage 8a and the fuel gas supplied to the fuel gas passage 8b to generate electric power while being sequentially cooled down by the primary cooling water supplied to a primary cooling water passage 8c.

In the fuel cell system 100 according to the present embodiment, as described above, the second end of the outward route 2a of the total enthalpy heat exchanger 2 and the first end of the oxidizing gas passage 8a of the polymer electrolyte fuel cell 8 are connected to each other by a predetermined pipe, and the second end of the oxidizing gas passage 8a of the polymer electrolyte fuel cell 8 and the first end of the return route 2b of the total enthalpy heat exchanger 2 are connected to each other by a predetermined pipe. Moreover, in the fuel cell system 100, the second end of the outward route 5a of the humidifier 5 and the first end of the fuel gas passage 8b of the polymer electrolyte fuel cell 8 are connected to each other by a predetermined pipe, and the second end of the fuel gas passage 8b of the polymer electrolyte fuel cell 8 and the first end of the off gas passage 6a of the condenser 6 are connected to each other by a predetermined pipe.

As shown in FIG. 1, the fuel cell system 100 according to Embodiment 1 of the present invention includes a primary cooling water tank 9, a pump 10, the condenser 6, the heater 5c, and a heat exchanger 11. The primary cooling water tank 9 stores the primary cooling water introduced from an inlet port thereof and discharges the primary cooling water from an outlet port thereof. The pump 10 receives the primary cooling water from an inlet port thereof and discharges the primary cooling water from an outlet port thereof. As described above, the condenser 6 cools down the off gas, supplied to the off gas passage 6a, by the primary cooling water supplied to the primary cooling water passage 6b. The heater 5c heats the humidifier 5 by utilizing the primary cooling water supplied to a primary cooling water passage 5d and increased in temperature. The heat exchanger 11 carries out the heat exchange between the primary cooling water supplied to a primary cooling water passage 11a and the secondary cooling water supplied to a secondary cooling water passage 11b.

In the fuel cell system 100 according to the present embodiment, the outlet port of the primary cooling water tank 9 and the inlet port of the pump 10 are connected to each other by a predetermined pipe, the outlet port of the pump 10 and a first end of the primary cooling water passage 6b of the condenser 6 are connected to each other by a predetermined pipe. Moreover, in the fuel cell system 100, a second end of the primary cooling water passage 6b of the condenser 6 and a first end of the primary cooling water passage 8c of the polymer electrolyte fuel cell 8 are connected to each other by a predetermined pipe, and a second end of the primary cooling water passage 8c of the polymer electrolyte fuel cell 8 and a first end of the primary cooling water passage 5d of the heater 5c are connected to each other by a predetermined pipe. Further, in the fuel cell system 100, a second end of the primary cooling water passage 5d of the heater 5c and a first end of the primary cooling water passage 11a of the heat exchanger 11 are connected to each other by a predetermined pipe, and a second end of the primary cooling water passage 11a of the heat exchanger 11 and the inlet port of the primary cooling water tank 9 are connected to each other by a predetermined pipe. Thus, the primary cooling water supplying and discharging system is configured in the fuel cell system 100.

As shown in FIG. 1, the fuel cell system 100 according to Embodiment 1 includes a secondary cooling water tank 12, a pump 13, the condenser 3, the condenser 7, the heat exchanger 11, and a heat radiator 14. The secondary cooling water tank 12 stores the secondary cooling water introduced from an inlet port thereof and discharges the secondary cooling water from an outlet port thereof. The pump 13 receives the secondary cooling water from an inlet port thereof and discharges the secondary cooling water from an outlet port thereof. As described above, the condenser 3 carries out the heat exchange between the off air supplied to the off air passage 3a and the secondary cooling water supplied to the secondary cooling water passage 3b, and the condenser 7 carries out the heat exchange between the off gas supplied to the off gas passage 7a and the secondary cooling water supplied to the secondary cooling water passage 7b. As described above, the heat exchanger 11 carries out the heat exchange between the primary cooling water supplied to the primary cooling water passage 11a and the secondary cooling water supplied to the secondary cooling water passage 11b. The heat radiator 14 lowers the temperature of the secondary cooling water by causing the secondary cooling water, supplied to a secondary cooling water passage 14a, to radiate heat.

In the fuel cell system 100 according to the present embodiment, the outlet port of the secondary cooling water tank 12 and the inlet port of the pump 13 are connected to each other by a predetermined pipe, and the outlet port of the pump 13 is connected by a predetermined pipe to a first end of the secondary cooling water passage 3b of the condenser 3 and a first end of the secondary cooling water passage 7b of the condenser 7. Moreover, in the fuel cell system 100, a second end of the secondary cooling water passage 3b of the condenser 3 and a second end of the secondary cooling water passage 7b of the condenser 7 are connected to a first end of the secondary cooling water passage 11b of the heat exchanger 11 by a predetermined pipe, and a second end of the secondary cooling water passage 11b of the heat exchanger 11 and a first end of the secondary cooling water passage 14a of the heat radiator 14 are connected to each other by a predetermined pipe. Further, in the fuel cell system 100, a second end of the secondary cooling water passage 14a of the heat radiator 14 and the inlet port of the secondary cooling water tank 12 are connected to each other by a predetermined pipe. Thus, a secondary cooling water supplying and discharging system is configured in the fuel cell system 100.

As shown in FIG. 1, the fuel cell system 100 according to Embodiment 1 includes a control device 17. Although an input terminal and an output terminal of the control device 17 are not especially shown in FIG. 1, they are electrically and appropriately connected to input terminals and output terminals of respective components constituting the fuel cell system 100. The control device 17 suitably controls operations of the fuel cell system 100 in, for example, the electric power generating operation.

Next, the following will explain a configuration of forcibly cooling down the off gas to increase water available to humidify the fuel gas and surely humidifying the fuel gas up to a predetermined dew point using the water, regarding the configuration of the fuel cell system according to Embodiment 1 of the present invention.

The present embodiment exemplifies a configuration in which: the condenser 6 and the humidifier 5 including the heater 5c shown in FIG. 1 are integrated with each other to constitute a condensing and humidifying device; the water available to humidify the fuel gas is increased by the condensing and humidifying device; and the fuel gas is surely humidified up to a predetermined dew point by the condensing and humidifying device.

Figure 2:
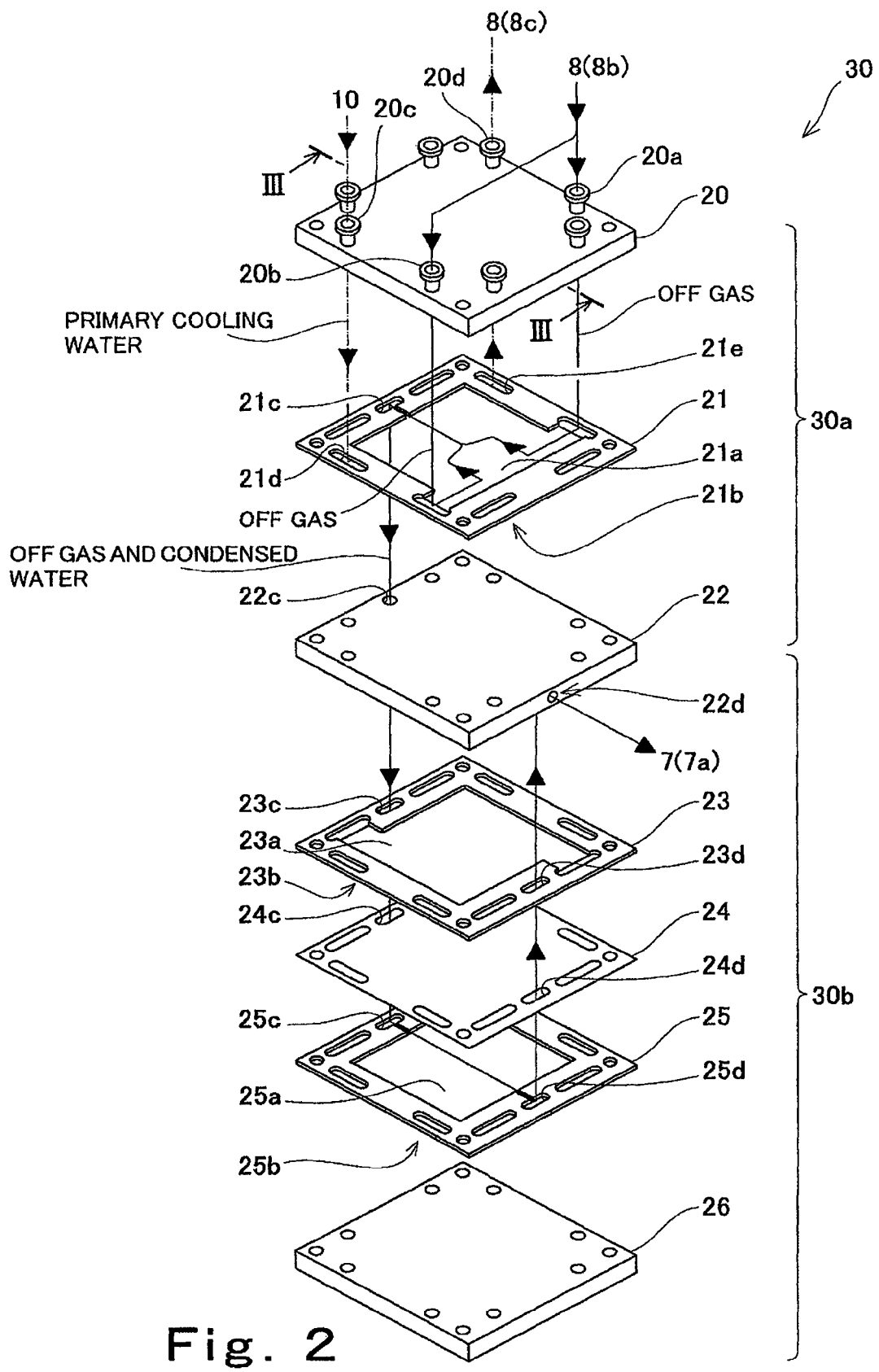
FIG. 2 is an exploded perspective view schematically showing one example of the configuration of a condensing and humidifying device according to Embodiment 1 of the present invention.

FIG. 2 is an exploded perspective view schematically showing one example of the configuration of the condensing and humidifying device according to Embodiment 1 of the present invention. In FIG. 2, each of solid lines having arrows denotes a flow route and flow direction of the off gas in the electric power generating operation of the fuel cell system 100. Each of broken lines having arrows denotes a flow route and flow direction of the primary cooling water in the electric power generating operation of the fuel cell system 100.

Figure 3:
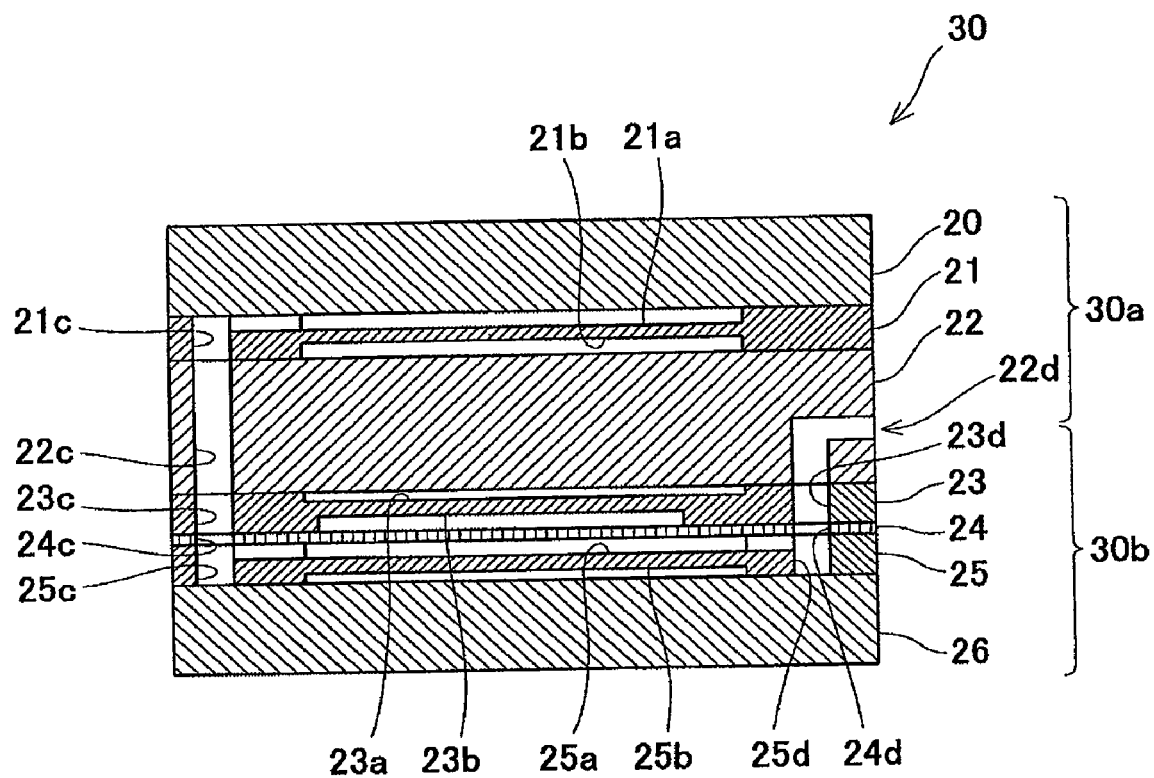
FIG. 3 is a cross-sectional view schematically showing the configuration of a cross section of the condensing and humidifying device according to Embodiment 1 of the present invention.

FIG. 3 is a cross-sectional view schematically showing the configuration of a cross section of the condensing and humidifying device according to Embodiment 1 of the present invention. FIG. 3 schematically shows the configuration of a cross section taken along line III-III of the completed condensing and humidifying device shown in FIG. 2.

As shown in FIGS. 2 and 3, a condensing and humidifying device 30 according to Embodiment 1 of the present invention includes a condensing portion 30a corresponding to the condenser 6 shown in FIG. 1 and a humidifying portion 30b corresponding to the humidifier 5 including the heater 5c shown in FIG. 1. The condensing portion 30a and the humidifying portion 30b are coaxially stacked on and integrated with each other to constitute the condensing and humidifying device 30.

The condensing portion 30a includes an end plate 20, a condensing plate 21, and an insulating plate 22. The end plate 20, the condensing plate 21, and the insulating plate 22 are coaxially stacked on one another in this order and are integrated with one another to constitute the condensing portion 30a. For convenience sake, the following explanation will be made on the basis that the insulating plate 22 belongs to both the condensing portion 30a and the humidifying portion 30b.

As shown in FIGS. 2 and 3, the end plate 20 is constituted by a flat plate having a predetermined thickness, and has a rectangular shape in plan view. An inlet port 20a, an inlet port 20b, an inlet port 20c, and an outlet port 20d are formed at predetermined positions of the end plate 20. The inlet port 20a and the inlet port 20b of the end plate 20 correspond to the first end of the off gas passage 6a of the condenser 6 shown in FIG. 1. The inlet port 20c of the end plate 20 corresponds to the first end of the primary cooling water passage 6b of the condenser 6 shown in FIG. 1. The outlet port 20d of the end plate 20 corresponds to the second end of the primary cooling water passage 6b of the condenser 6 shown in FIG. 1.

In the present embodiment, the inlet port 20a and the inlet port 20b of the end plate 20 are connected by a predetermined pipe to the second end of the fuel gas passage 8b of the polymer electrolyte fuel cell 8 shown in FIG. 1. The inlet port 20c of the end plate 20 and the outlet port of the pump 10 shown in FIG. 1 are connected to each other by a predetermined pipe. The outlet port 20d of the end plate 20 and the first end of the primary cooling water passage 8c of the polymer electrolyte fuel cell 8 are connected to each other by a predetermined pipe. Then, the off gas discharged from the fuel gas passage 8b of the polymer electrolyte fuel cell 8 shown in FIG. 1 is supplied to the inlet port 20a and the inlet port 20b. The primary cooling water discharged from the pump 10 shown in FIG. 1 is supplied to the inlet port 20c. The primary cooling water supplied to the inlet port 20c and having been used to cool down the off gas is discharged from the outlet port 20d toward the primary cooling water passage 8c of the polymer electrolyte fuel cell 8.

The condensing plate 21 is constituted by a flat plate having a predetermined thickness, and has a rectangular shape similar to the end plate 20 in plan view. A concave portion 21a is formed in a predetermined substantially rectangular region on an upper side of the condensing plate 21 in FIG. 2. The concave portion 21a is formed to have a substantially uniform depth in the above-described predetermined substantially rectangular region. A concave portion 21b is formed in a predetermined substantially rectangular region on a lower side of the condensing plate 21 in FIG. 2 (especially see FIG. 3). The concave portion 21b is formed to have a substantially uniform depth in the above-described predetermined substantially rectangular region similar to the concave portion 21a. A through hole 21c, a through hole 21d, and a through hole 21e are formed at predetermined positions of the condensing plate 21. The through hole 21c, the through hole 21d, and the through hole 21e penetrate through the condensing plate 21 in a thickness direction thereof. The through hole 21d and the through hole 21e are formed at predetermined positions of the condensing plate 21 so as to be opposed to the inlet port 20c and the outlet port 20d, respectively, of the end plate 20.

In the present embodiment, the inlet port 20a and the inlet port 20b of the end plate 20 are communicated with the concave portion 21a and the through hole 21c of the condensing plate 21. An off gas passage constituted by the inlet port 20a, the inlet port 20b, the concave portion 21a, and the through hole 21c corresponds to the off gas passage 6a of the condenser 6 shown in FIG. 1. The through hole 21c corresponds to the second end of the off gas passage 6a of the condenser 6 shown in FIG. 1. The inlet port 20c of the end plate 20 is communicated with the concave portion 21b of the condensing plate 21 via the through hole 21d of the condensing plate 21, and the concave portion 21b of the condensing plate 21 is communicated with the outlet port 20d of the end plate 20 via the through hole 21e of the condensing plate 21. A primary cooling water passage constituted by the inlet port 20c, the through hole 21d, the concave portion 21b, the through hole 21e, and the outlet port 20d corresponds to the primary cooling water passage 6b of the condenser 6 shown in FIG. 1. The off gas supplied to the inlet port 20a and the inlet port 20b of the end plate 20 is supplied to a space defined by the concave portion 21a of the condensing plate 21 and a lower surface of the end plate 20. The supplied off gas moves in the space defined by the concave portion 21a of the condensing plate 21 and the lower surface of the end plate 20, and then is discharged from the through hole 21c of the condensing plate 21 together with the condensed water. The primary cooling water supplied to the inlet port 20c of the end plate 20 is supplied to the through hole 21d of the condensing plate 21. After the primary cooling water supplied to the through hole 21d moves in a space defined by the concave portion 21b of the condensing plate 21 and an upper surface of the below-described insulating plate 22, it is discharged from the through hole 21e of the condensing plate 21. The primary cooling water discharged from the through hole 21e is discharged from the outlet port 20d of the end plate 20 toward the primary cooling water passage 8c of the polymer electrolyte fuel cell 8.

The insulating plate 22 is constituted by a flat plate having a predetermined thickness, and has a rectangular shape similar to the condensing plate 21 in plan view. A through hole 22c and a through hole 22d are formed at predetermined positions of the insulating plate 22. The through hole 22c is formed at a predetermined position of the insulating plate 22 so as to be opposed to the through hole 21c of the condensing plate 21. The through hole 22c penetrates through the insulating plate 22 in a thickness direction thereof. The through hole 22d is formed at a predetermined position of the insulating plate 22 so as to penetrate through the insulating plate 22 from a predetermined position on a lower surface of the insulating plate 22 to a predetermined position on a side surface of the insulating plate 22 and to bend in the form of an inverted L shape. The through hole 22d of the insulating plate 22 corresponds to the second end of the return route 5b of the humidifier 5 shown in FIG. 1.

In the present embodiment, the through hole 21c of the condensing plate 21 is communicated with the through hole 22c of the insulating plate 22. The through hole 22d of the insulating plate 22 and the first end of the off gas passage 7a of the condenser 7 shown in FIG. 1 are connected to each other by a predetermined pipe. A through hole 23d of a below-described first heating plate 23 is communicated with the through hole 22d of the insulating plate 22. The off gas and the condensed water discharged from the through hole 21c of the condensing plate 21 are supplied to the through hole 22c of the insulating plate 22. The off gas and the condensed water discharged from the through hole 23d of the below-described first heating plate 23 are supplied to the through hole 22d of the insulating plate 22. Then, the off gas and the condensed water supplied to the through hole 22d of the insulating plate 22 are discharged from the through hole 22d toward the off gas passage 7a of the condenser 7.

The humidifying portion 30b includes the above-described insulating plate 22, the above-described first heating plate 23, a humidifying membrane 24, a second heating plate 25, and an end plate 26. The insulating plate 22, the first heating plate 23, the humidifying membrane 24, the second heating plate 25, and the end plate 26 are coaxially stacked on one another in this order and integrated with one another to constitute the humidifying portion 30b.

As shown in FIGS. 2 and 3, the first heating plate 23 is constituted by a flat plate having a predetermined thickness, and has a rectangular shape similar to the insulating plate 22 in plan view. A concave portion 23a is formed in a predetermined substantially rectangular region on an upper side of the first heating plate 23 in FIG. 2. The concave portion 23a is formed to have a substantially uniform depth in the above-described predetermined substantially rectangular region. A concave portion 23b is formed in a predetermined substantially rectangular region on a lower side of the first heating plate 23 in FIG. 2 (especially see FIG. 3). The concave portion 23b is formed to have a substantially uniform depth in a predetermined substantially rectangular region similar to the above-described concave portion 23a. A through hole 23c and the through hole 23d are formed at predetermined positions of the first heating plate 23. The through hole 23c and the through hole 23d penetrate through the first heating plate 23 in a thickness direction thereof. The through hole 23c and the through hole 23d are formed at predetermined positions of the first heating plate 23 so as to be opposed to a first end of the through hole 22c of the insulating plate 22 and a first end of the through hole 22d of the insulating plate 22, respectively.

In the present embodiment, the through hole 22c of the insulating plate 22 is communicated with the through hole 23c of the first heating plate 23. A through hole 24d of the below-described humidifying membrane 24 is communicated with the through hole 23d of the first heating plate 23. The second end of the primary cooling water passage 8c of the polymer electrolyte fuel cell 8 shown in FIG. 1 is communicated with the concave portion 23a of the first heating plate 23. A primary cooling water passage constituted by the concave portion 23a corresponds to the primary cooling water passage 5d of the heater 5c shown in FIG. 1. The fuel gas outlet port of the hydrogen generator 4 shown in FIG. 1 is communicated with the concave portion 23b of the first heating plate 23. A fuel gas passage constituted by the concave portion 23b corresponds to the outward route 5a of the humidifier 5 shown in FIG. 1. The primary cooling water discharged from the primary cooling water passage 8c of the polymer electrolyte fuel cell 8 is supplied to a space defined by the concave portion 23a of the first heating plate 23 and the lower surface of the insulating plate 22. After the supplied primary cooling water moves in the space defined by the concave portion 23a of the first heating plate 23 and the lower surface of the insulating plate 22, it is discharged toward the primary cooling water passage 11a of the heat exchanger 11 shown in FIG. 1. The fuel gas discharged from the fuel gas outlet port of the hydrogen generator 4 is supplied in a space defined by the concave portion 23b of the first heating plate 23 and an upper surface of the below-described humidifying membrane 24. After the supplied fuel gas moves in the space defined by the concave portion 23b of the first heating plate 23 and the upper surface of the humidifying membrane 24, it is discharged toward the fuel gas passage 8b of the polymer electrolyte fuel cell 8 shown in FIG. 1. The off gas and the condensed water discharged from the through hole 22c of the insulating plate 22 are supplied to the through hole 23c of the first heating plate 23. The off gas and the condensed water discharged from the through hole 24d of the below-described humidifying membrane 24 are supplied to the through hole 23d of the first heating plate 23.

The humidifying membrane 24 is constituted by a microporous polymer membrane having a predetermined thickness and high moisture permeability or a non-porous polymer membrane having a predetermined thickness and high moisture permeability, and has a rectangular shape similar to the first heating plate 23 in plan view. A through hole 24c and the through hole 24d are formed at predetermined positions of the humidifying membrane 24. The through hole 24c is formed at a predetermined position of the humidifying membrane 24 so as to be opposed to the through hole 23c of the first heating plate 23. The through hole 24c penetrates through the humidifying membrane 24 in a thickness direction thereof. The through hole 24d is formed at a predetermined position of the humidifying membrane 24 so as to be opposed to the through hole 23d of the first heating plate 23. The through hole 24d penetrates through the humidifying membrane 24 in a thickness direction thereof.

In the present embodiment, the through hole 23c of the first heating plate 23 is communicated with the through hole 24c of the humidifying membrane 24. A through hole 25d of the below-described second heating plate 25 is communicated with the through hole 24d of the humidifying membrane 24. The off gas and the condensed water discharged from the through hole 23c of the first heating plate 23 are supplied to the through hole 24c of the humidifying membrane 24. The off gas and the condensed water discharged from the through hole 25d of the below-described second heating plate 25 are supplied to the through hole 24d of the humidifying membrane 24.

The second heating plate 25 is constituted by a flat plate having a predetermined thickness, and has a rectangular shape similar to the humidifying membrane 24 in plan view. A concave portion 25a is formed in a predetermined substantially rectangular region on an upper side of the second heating plate 25 in FIG. 2. The concave portion 25a is formed to have a substantially uniform depth in the above-described predetermined substantially rectangular region. A concave portion 25b is formed in a predetermined substantially rectangular region on a lower side of the second heating plate 25 in FIG. 2 (especially see FIG. 3). The concave portion 25b is formed to have a substantially uniform depth in a predetermined substantially rectangular region similar to the above-described concave portion 25a. A through hole 25c and the through hole 25d are formed at predetermined positions of the second heating plate 25. The through hole 25c and the through hole 25d penetrate through the second heating plate 25 in a thickness direction thereof. The through hole 25c and the through hole 25d are formed at predetermined positions of the second heating plate 25 so as to be opposed to the through hole 24c and the through hole 24d, respectively, of the humidifying membrane 24.

In the present embodiment, the through hole 24c of the humidifying membrane 24 is communicated with the through hole 25c of the second heating plate 25. The through hole 25d of the second heating plate 25 is communicated with the through hole 24d of the humidifying membrane 24. The through hole 25c of the second heating plate 25 is communicated with the concave portion 25a of the second heating plate 25, and the concave portion 25a is communicated with the through hole 25d of the second heating plate 25. An off gas passage constituted by the concave portion 25a corresponds to the return route 5b of the humidifier 5 shown in FIG. 1. The second end of the primary cooling water passage 8c of the polymer electrolyte fuel cell 8 shown in FIG. 1 is also communicated with the concave portion 25b of the second heating plate 25. A primary cooling water passage constituted by the concave portion 25b also corresponds to the primary cooling water passage 5d of the heater 5c shown in FIG. 1. The off gas and the condensed water discharged from the through hole 24c of the humidifying membrane 24 are supplied to the through hole 25c of the second heating plate 25, and the supplied off gas and condensed water are supplied from the through hole 25c of the second heating plate 25 to a space defined by the concave portion 25a and a lower surface of the humidifying membrane 24. After the supplied off gas and condensed water move in the space defined by the concave portion 25a and the lower surface of the humidifying membrane 24, they are supplied to the through hole 24d of the humidifying membrane 24 via the through hole 25d of the second heating plate 25. The primary cooling water discharged from the primary cooling water passage 8c of the polymer electrolyte fuel cell 8 is supplied to a space defined by the concave portion 25b of the second heating plate 25 and an upper surface of the below-described end plate 26. After the supplied primary cooling water moves in the space defined by the concave portion 25b of the second heating plate 25 and the upper surface of the below-described end plate 26, it is discharged toward the primary cooling water passage 11a of the heat exchanger 11 shown in FIG. 1.

The end plate 26 is constituted by a flat plate having a predetermined thickness, and has a rectangular shape similar to the second heating plate 25 in plan view. As shown in FIG. 3, the end plate 26 closes a lower opening end of the through hole 25c of the second heating plate 25 and a lower opening end of the through hole 25d of the second heating plate 25.

The condensing and humidifying device 30 is disposed at a predetermined position of the fuel cell system 100 in a state in which a stack direction of the condensing and humidifying device 30 substantially conforms to a direction of gravitational force.

In the present embodiment, the condensing plate 21, the first heating plate 23, and the second heating plate 25 are made of a material having high heat conductivity. With this, the heat exchange in the condensing and humidifying device 30 is preferably carried out. Examples of the material having high heat conductivity are metallic materials, such as iron and stainless steel, and carbon materials similar to a carbon separator that is a component of the polymer electrolyte fuel cell 8. Each of the end plate 20, the end plate 26, and the insulating plate 22A is constituted by a resin flat plate having low heat conductivity. With this, the condensing and humidifying device 30 can be made thermally independent in the fuel cell system 100. In addition, the condensing portion 30a and the humidifying portion 30b can be thermally separated from each other in the condensing and humidifying device 30. Further, the microporous polymer membrane having high moisture permeability or the non-porous polymer membrane having high moisture permeability is used as the humidifying membrane 24. One example of the microporous polymer membrane having high moisture permeability or the non-porous polymer membrane having high moisture permeability is a solid polymer electrolyte membrane similar to a solid polymer electrolyte membrane that is a component of the polymer electrolyte fuel cell 8.

Next, the operations of the fuel cell system according to Embodiment 1 of the present invention will be explained.

In the fuel cell system 100 according to Embodiment 1 of the present invention, in order to obtain the humidified oxidizing gas necessary for the electric power generating operation, the oxidizing gas is introduced by the blower 1 in the electric power generating operation. The introduced oxidizing gas is supplied to the outward route 2a of the total enthalpy heat exchanger 2. The oxidizing gas supplied to the outward route 2a of the total enthalpy heat exchanger 2 is humidified in the outward route 2a of the total enthalpy heat exchanger 2 so as to have a predetermined dew point by the total enthalpy heat exchange with the off gas supplied to the return route 2b and discharged from the oxidizing gas passage 8a of the polymer electrolyte fuel cell 8. The oxidizing gas humidified to have a predetermined dew point is supplied from the outward route 2a of the total enthalpy heat exchanger 2 to the oxidizing gas passage 8a of the polymer electrolyte fuel cell 8.

The oxidizing gas supplied to the oxidizing gas passage 8a of the polymer electrolyte fuel cell 8 is used in the oxidizing gas passage 8a for the electric power generating operation. In the electric power generating operation of the polymer electrolyte fuel cell 8, oxygen of the oxidizing gas is consumed at a predetermined oxygen utilization ratio (Uo).

After the oxygen of the oxidizing gas is consumed in the oxidizing gas passage 8a of the polymer electrolyte fuel cell 8, the oxidizing gas is discharged from the oxidizing gas passage 8a as the off air. The discharged off air is supplied to the return route 2b of the total enthalpy heat exchanger 2. The off air supplied to the return route 2b is utilized in the total enthalpy heat exchanger 2 for the total enthalpy heat exchange with the oxidizing gas supplied from the blower 1 to the outward route 2a. The off air used in the total enthalpy heat exchanger 2 for the total enthalpy heat exchange with the oxidizing gas supplied to the outward route 2a is discharged from the return route 2b of the total enthalpy heat exchanger 2 and supplied to the off air passage 3a of the condenser 3.

The off air is cooled down in the off air passage 3a of the condenser 3 by the heat exchange with the secondary cooling water supplied to the secondary cooling water passage 3b. During this cooling, the steam contained in the off air is condensed and discharged from the condenser 3 as the condensed water. After the condensed water generated by this cooling is separated from the off air in the condenser 3, it is suitably utilized as, for example, cooling water in the fuel cell system 100. Meanwhile, the off air dehumidified in the condenser 3 is discharged toward an outside of the fuel cell system 100.

In the fuel cell system 100, in order to obtain the humidified fuel gas necessary for the electric power generating operation, a raw material, such as LPG, LNG, gasoline, or a city gas, is supplied to the hydrogen generator 4 in the electric power generating operation. At this time, water is supplied to the hydrogen generator 4 from an infrastructure, such as plumbing. The hydrogen generator 4 uses the supplied raw material and water to generate the fuel gas containing hydrogen by the steam-reforming reaction. When generating the fuel gas, the steam-reforming reaction proceeds in the hydrogen generator 4 by using the heat energy generated by the heater 4a. As shown in FIG. 1, in the fuel cell system 100 according to the present embodiment, the off gas discharged from the condenser 7 is supplied to the heater 4a of the hydrogen generator 4. The heater 4a burns the supplied off gas to generate the heat energy necessary to cause the steam-reforming reaction to proceed. The fuel gas generated in the hydrogen generator 4 is supplied to the outward route 5a of the humidifier 5.

The fuel gas generated in the hydrogen generator 4 is humidified in the outward route 5a of the humidifier 5 so as to have a predetermined dew point. When humidifying the fuel gas, the off gas and the condensed water discharged from the off gas passage 6a of the condenser 6 are supplied to the return route 5b of the humidifier 5. At this time, the humidifier 5 is heated by the heater 5c to a predetermined temperature using as the heat source the primary cooling water discharged from the primary cooling water passage 8c of the polymer electrolyte fuel cell 8 and increased in temperature. With this, each of the fuel gas supplied to the outward route 5a of the humidifier 5 and the water supplied to the return route 5b of the humidifier 5 and available to humidify the fuel gas is heated to have a predetermined temperature. Therefore, the fuel gas is humidified to have a predetermined dew point. The fuel gas humidified to have a predetermined dew point is supplied from the outward route 5a of the humidifier 5 to the fuel gas passage 8b of the polymer electrolyte fuel cell 8.

The fuel gas supplied to the fuel gas passage 8b of the polymer electrolyte fuel cell 8 is used in the fuel gas passage 8b for the electric power generating operation. In the electric power generating operation of the polymer electrolyte fuel cell 8, hydrogen of the fuel gas is consumed at a predetermined fuel utilization ratio (Uf).

After the hydrogen of the fuel gas is consumed in the fuel gas passage 8b of the polymer electrolyte fuel cell 8, the fuel gas is discharged from the fuel gas passage 8b as the off gas. The off gas discharged from the fuel gas passage 8b is supplied to the off gas passage 6a of the condenser 6. In the fuel cell system 100 according to the present embodiment, the off gas (having a temperature T1) discharged from the fuel gas passage 8b of the polymer electrolyte fuel cell 8 and supplied to the off gas passage 6a of the condenser 6 is forcibly cooled down in the condenser 6 by the heat exchange with the primary cooling water (having a temperature T2 that is lower than T1) as the cooling medium supplied by the pump 10 from the primary cooling water tank 9 to the primary cooling water passage 6b of the condenser 6. Thus, the condenser 6 forcibly converts the steam contained in the off gas into the condensed water. To be specific, in the present embodiment, the steam contained in the off gas is forcibly converted into the condensed water by utilizing the primary cooling water as the cooling medium, thereby forcibly increasing the water available to humidify the fuel gas in the condenser 6. The increased water available to humidify the fuel gas is supplied to the return route 5b of the humidifier 5 together with the off gas. The water supplied to the return route 5b is utilized in the humidifier 5 to humidify the fuel gas supplied from the hydrogen generator 4 to the outward route 5a. At this time, the high-temperature primary cooling water discharged from the primary cooling water passage 8c of the polymer electrolyte fuel cell 8 is supplied to the primary cooling water passage 5d, and thereby the heater 5c heats the humidifier 5. With this, the fuel gas generated in the hydrogen generator 4 is adequately and surely humidified in the humidifier 5 so as to have a predetermined dew point.

More specifically, referring to FIGS. 1 to 3, the off gas discharged from the fuel gas passage 8b of the polymer electrolyte fuel cell 8 and supplied to the inlet port 20a and the inlet port 20b of the end plate 20 of the condensing portion 30a of the condensing and humidifying device 30 is introduced to the concave portion 21a of the condensing plate 21. The off gas introduced to the concave portion 21a of the condensing plate 21 is forcibly cooled down by the heat exchange with the primary cooling water flowing through the concave portion 21b of the condensing plate 21. The primary cooling water is introduced by the pump 10 from the primary cooling water tank 9 to the concave portion 21b via the inlet port 20c of the end plate 20 and the through hole 21d of the condensing plate 21. The primary cooling water introduced to the concave portion 21b of the condensing plate 21 is discharged to the primary cooling water passage 8c of the polymer electrolyte fuel cell 8 via the through hole 21e of the condensing plate 21 and the outlet port 20d of the end plate 20. The off gas discharged from the polymer electrolyte fuel cell 8 is cooled down by the primary cooling water in the condensing portion 30a, and thereby the off gas (containing the liquid portion of the two-layer fluid) and the condensed water generated by the cooling using the primary cooling water are discharged from the through hole 21c of the condensing plate 21.

After the increased water available to humidify the fuel gas is discharged from the through hole 21c of the condensing plate 21 of the condensing portion 30a, the water moves downward by the gravitational force and is introduced to the through hole 25c of the second heating plate 25 of the humidifying portion 30b of the condensing and humidifying device 30. Then, the water is introduced from the through hole 25c to the concave portion 25a of the second heating plate 25. The fuel gas generated in the hydrogen generator 4 is introduced to the concave portion 23b of the first heating plate 23 of the humidifying portion 30b of the condensing and humidifying device 30.

The high-temperature primary cooling water discharged from the primary cooling water passage 8c of the polymer electrolyte fuel cell 8 is supplied to the concave portion 23a of the first heating plate 23 and the concave portion 25b of the second heating plate 25 in the humidifying portion 30b of the condensing and humidifying device 30. Then, in the humidifying portion 30b of the condensing and humidifying device 30, the fuel gas introduced to the concave portion 23b is heated by the high-temperature primary cooling water supplied to the concave portion 23a of the first heating plate 23, and the water introduced to the concave portion 25a is heated by the high-temperature primary cooling water supplied to the concave portion 25b of the second heating plate 25. With this, in the humidifying portion 30b, the water moves from the second heating plate 25 side to the first heating plate 23 side via the humidifying membrane 24. Then, the fuel gas generated in the hydrogen generator 4 is adequately and surely humidified in the concave portion 23b of the first heating plate 23 of the humidifying portion 30b so as to have a predetermined dew point.

After the fuel gas generated in the hydrogen generator 4 is humidified in the concave portion 23b of the first heating plate 23 of the humidifying portion 30b so as to have a predetermined dew point, it is discharged from the condensing and humidifying device 30. The fuel gas humidified to have a predetermined dew point is supplied to the fuel gas passage 8b of the polymer electrolyte fuel cell 8. After a part of the water introduced to the concave portion 25a of the second heating plate 25 of the humidifying portion 30b is utilized to humidify the fuel gas, the water is discharged to the off gas passage 7a of the condenser 7 via the through hole 22d of the insulating plate 22 together with the off gas. After the heat energy of the primary cooling water supplied to the concave portion 23a of the first heating plate 23 of the humidifying portion 30b and the concave portion 25b of the second heating plate 25 of the humidifying portion 30b is utilized to humidify the fuel gas, the primary cooling water is discharged from the condensing and humidifying device 30 to the primary cooling water passage 11a of the heat exchanger 11.

After the off gas and the condensed water used to humidify the fuel gas supplied to the outward route 5a of the humidifier 5 are discharged from the return route 5b of the humidifier 5, they are supplied to the off gas passage 7a of the condenser 7.

The off gas is cooled down in the off gas passage 7a of the condenser 7 by the heat exchange with the secondary cooling water supplied to the secondary cooling water passage 7b of the condenser 7. During this cooling, the steam contained in the off gas is condensed and discharged from the condenser 7 as the condensed water. After the condensed water generated by this cooling is separated from the off gas in the condenser 7, it is suitably utilized as, for example, cooling water in the fuel cell system 100. Meanwhile, the off gas dehumidified in the condenser 7 is supplied to the heater 4a of the hydrogen generator 4 as the combustion fuel.

In the fuel cell system 100, the polymer electrolyte fuel cell 8 generates heat in the electric power generating operation. Therefore, in the fuel cell system 100, the primary cooling water circulates in the primary cooling water supplying and discharging system in order to maintain the temperature of the polymer electrolyte fuel cell 8 at a substantially constant temperature. At this time, the primary cooling water is also used to cool down the off gas and humidify the fuel gas.

In the present embodiment, in order to maintain the temperature of the polymer electrolyte fuel cell 8 at a substantially constant temperature, the primary cooling water stored in the primary cooling water tank 9 is supplied to the primary cooling water passage 6b of the condenser 6 by the pump 10 in the electric power generating operation. When the primary cooling water supplied to the primary cooling water passage 6b of the condenser 6 flows through the primary cooling water passage 6b, it lowers the temperature of the off gas flowing through the off gas passage 6a. After the primary cooling water used to cool down the off gas in the condenser 6 is discharged from the primary cooling water passage 6b, it is supplied to the primary cooling water passage 8c of the polymer electrolyte fuel cell 8.

When the primary cooling water supplied to the primary cooling water passage 8c of the polymer electrolyte fuel cell 8 flows through the primary cooling water passage 8c, it cools down the polymer electrolyte fuel cell 8 which generates heat in the electric power generating operation. With this, in the fuel cell system 100, the temperature of the polymer electrolyte fuel cell 8 is maintained at a substantially constant temperature. Meanwhile, the primary cooling water is increased in temperature by receiving exhaust heat of the polymer electrolyte fuel cell 8. After the primary cooling water used to cool down the polymer electrolyte fuel cell 8 and increased in temperature in the polymer electrolyte fuel cell 8 is discharged from the primary cooling water passage 8c, it is supplied to the primary cooling water passage 5d of the heater 5c of the humidifier 5.

When the primary cooling water supplied to the primary cooling water passage 5d of the heater 5c flows through the primary cooling water passage 5d, it is used as the heat source which heats the humidifier 5. That is, the heater 5c heats the humidifier 5 by using as the heat source the high-temperature primary cooling water supplied to the primary cooling water passage 5d. Thus, the humidifier 5 is heated to a predetermined temperature. After the primary cooling water used to heat the humidifier 5 in the heater 5c is discharged from the primary cooling water passage 5d, it is supplied to the primary cooling water passage 11a of the heat exchanger 11.

When the primary cooling water supplied to the primary cooling water passage 11a of the heat exchanger 11 flows through the primary cooling water passage 11a, it is cooled down by the secondary cooling water supplied to the secondary cooling water passage 11b of the heat exchanger 11. After the primary cooling water cooled down by the heat exchange with the secondary cooling water is discharged from the primary cooling water passage 11a of the heat exchanger 11, it is caused to return to the primary cooling water tank 9. This circulation of the primary cooling water in the primary cooling water supplying and discharging system is realized by a water feeding action of the pump 10.

In the fuel cell system 100, in the electric power generating operation, surplus heat remains in the primary cooling water discharged from the primary cooling water passage 5d of the heater 5c of the humidifier 5. Therefore, in the fuel cell system 100, in order to collect and radiate the surplus heat remaining in the primary cooling water discharged from the heater 5c, the secondary cooling water circulates in the secondary cooling water supplying and discharging system. At this time, the secondary cooling water is also utilized to dehumidify the off air discharged from the total enthalpy heat exchanger 2 and the off gas discharged from the humidifier 5.

In the present embodiment, in order to collect and radiate the surplus heat remaining in the primary cooling water discharged from the heater 5c, the secondary cooling water stored in the secondary cooling water tank 12 is supplied to the secondary cooling water passage 3b of the condenser 3 and the secondary cooling water passage 7b of the condenser 7 by the pump 13 in the electric power generating operation. When the secondary cooling water supplied to the secondary cooling water passage 3b of the condenser 3 and the secondary cooling water passage 7b of the condenser 7 flows through the secondary cooling water passage 3b and the secondary cooling water passage 7b, it lowers the temperature of the off air flowing through the off air passage 3a and the temperature of the off gas flowing through the off gas passage 7a. After the secondary cooling water used to cool down the off air in the condenser 3 and the off gas in the condenser 7 is discharged from the secondary cooling water passage 3b and the secondary cooling water passage 7b, it is supplied to the secondary cooling water passage 11b of the heat exchanger 11.

When the secondary cooling water supplied to the secondary cooling water passage 11b of the heat exchanger 11 flows through the secondary cooling water passage 11b, it cools down the primary cooling water supplied to the primary cooling water passage 11a of the heat exchanger 11. After the secondary cooling water increased in temperature by the heat exchange with the primary cooling water is discharged from the secondary cooling water passage 11b of the heat exchanger 11, it is supplied to the secondary cooling water passage 14a of the heat radiator 14.

When the secondary cooling water supplied to the secondary cooling water passage 14a of the heat radiator 14 flows through the secondary cooling water passage 14a, it is cooled down up to a predetermined temperature by, for example, air.

After the secondary cooling water cooled down in the secondary cooling water passage 14a is discharged from the heat radiator 14, it is caused to return to the secondary cooling water tank 12. The circulation of the secondary cooling water in the secondary cooling water supplying and discharging system is realized by the water feeding action of the pump 13.

By the above-described operations of the fuel cell system 100, a predetermined voltage is generated at an output terminal of the polymer electrolyte fuel cell 8. In the fuel cell system 100, the output terminal of the polymer electrolyte fuel cell 8 is connected to an input terminal of an electric power load circuit via a predetermined conducting wire. Then, an output terminal of the electric power load circuit is connected to an output terminal of the fuel cell system 100 via a predetermined conducting wire. A user can utilize a desired load by electrically connecting the output terminal of the fuel cell system 100 to a power supply terminal of the desired load.

In accordance with the fuel cell system according to the present embodiment, even in a case where the dew point of the fuel gas generated in the hydrogen generator is lowered in the electric power generating operation, the water available to humidify the fuel gas does not lack since the steam contained in the off gas is forcibly converted into the condensed water by the condenser. To be specific, in accordance with the fuel cell system according to the present embodiment, when the heater heats the humidifier by using as the heat source the cooling water discharged from the primary cooling water passage of the polymer electrolyte fuel cell and increased in temperature, an adequate amount of water available to humidify the fuel gas generated in the hydrogen generator is supplied to the humidifier. Therefore, the fuel gas generated in the hydrogen generator is adequately and surely humidified in the humidifier. With this, the fuel gas having a predetermined dew point is stably supplied to the fuel gas passage of the polymer electrolyte fuel cell. With this configuration, an adverse affect with respect to the life of the polymer electrolyte fuel cell in the fuel cell system is reduced. As a result, it is possible to provide the durable and reliable fuel cell system capable of stably supplying electric power for a long period of time.

Moreover, in accordance with the fuel cell system according to the present embodiment, even in a case where the dew point of the off gas discharged from the fuel gas passage of the polymer electrolyte fuel cell is lowered in the electric power generating operation, the water available to humidify the fuel gas does not lack since the steam contained in the off gas is forcibly converted into the condensed water by the condenser. Therefore, the fuel gas generated in the hydrogen generator can be adequately and surely humidified in the humidifier.

Further, in accordance with the fuel cell system according to the present embodiment, it is possible to adequately and surely humidify the fuel gas, supplied to the polymer electrolyte fuel cell, by a simple configuration using a conventional humidifier without disposing the exclusive auxiliary device, such as the extremely small capacity feed-water pump. As a result, it is possible to provide the cheap, durable, and reliable fuel cell system.

Example 1

Effects obtained by the present invention were verified by using the fuel cell system including the block configuration shown in FIG. 1 and the condensing and humidifying device shown in FIGS. 2 and 3.

Used in the present verification was a stationary polymer electrolyte fuel cell whose rated output power was 1 kw. The number of stacked cells of the polymer electrolyte fuel cell was 20. An electrode surface area of the polymer electrolyte fuel cell was 200 cm$^2$. When the fuel gas and the oxidizing gas were supplied to the polymer electrolyte fuel cell, the fuel utilization ratio (Uf) was 75%, the oxygen utilization ratio (Uo) was 50%, and a load whose output current was 80 A (current density was 0.4 A/cm$^2$) was connected to the polymer electrolyte fuel cell, the output voltage of 14.5 V (average cell voltage of 0.725 V) and the output power of about 1.15 kw were obtained. At this time, the fuel gas was supplied to the fuel gas passage of the polymer electrolyte fuel cell such that hydrogen was supplied at a rate of 14 liters per minute. In addition, air as the oxidizing gas was supplied to the oxidizing gas passage of the polymer electrolyte fuel cell at a rate of 55 liters per minute. The air was supplied by compressing air in a laboratory by a blower. After each of the fuel gas and the oxidizing gas was humidified to have a dew point of 64° C., the fuel gas and the oxidizing gas were supplied to the fuel gas passage and the oxidizing gas passage, respectively, of the polymer electrolyte fuel cell.

In the electric power generating operation of the fuel cell system, the primary cooling water supplying and discharging system and the secondary cooling water supplying and discharging system were controlled by a predetermined control device such that the temperature of the primary cooling water supplied to the primary cooling water passage of the polymer electrolyte fuel cell became 60° C. and the temperature of the primary cooling water discharged from the primary cooling water passage of the polymer electrolyte fuel cell became 72° C. At this time, the primary cooling water was supplied to the primary cooling water passage of the polymer electrolyte fuel cell at a rate of 1.5 liters per minute. In the present verification, pure water was used as the primary cooling water. As the secondary cooling water, an antifreezing fluid containing ethylene glycol at a concentration of 30% was used.

In the fuel cell system, the off gas discharged from the polymer electrolyte fuel cell in the electric power generating operation was a two-layer fluid. In the present verification, the off gas was discharged in a state of a mixture of an exhaust fuel gas having the dew point of 72° C. and liquid water. An actual average dew point of the off gas was 80° C., which was measured by a mirror surface type dew point measuring device to which a revaporizer of the liquid water was attached. It was found that the actual dew point of the off gas was changing over time in a range of 80±2° C. It was understood that the change over time of the dew point of the off gas occurred since the water generated in the polymer electrolyte fuel cell was not discharged at a constant rate but was accumulated and discharged.

Moreover, in the present verification, used as the hydrogen generator was a hydrogen generator of a type which used as the heat source the combustion heat of the off gas discharged from the polymer electrolyte fuel cell. The hydrogen generator included a reformer, a shift converter, and a selective oxidizer. The reformer caused the steam-reforming reaction to proceed by catalysis of a platinum catalyst by using the natural gas (13A) as the raw material, thereby generating the fuel gas containing hydrogen. In the present verification, the fuel gas was generated such that the temperature of the platinum catalyst was controlled to be 650° C. and the S/C was controlled to be 2.6. As a result, the steam-reforming reaction could proceed at a conversion rate of about 90%. Moreover, the shift converter caused a water gas shift reaction to proceed by catalysis of a copper-zinc catalyst by utilizing the water contained in the fuel gas, thereby reducing the concentration of carbon monoxide in the fuel gas. In the present verification, the water gas shift reaction was caused to proceed while the temperature of the copper-zinc catalyst was controlled to be 350° C. Further, the selective oxidizer caused a selective oxidation reaction to proceed by catalysis of a predetermined selective oxidation catalyst by utilizing oxygen contained in the air, thereby further reducing the concentration of carbon monoxide in the fuel gas. In the present verification, the temperature of the predetermined selective oxidation catalyst was controlled to be 160° C. As a result, the concentration of carbon monoxide in the fuel gas was reduced up to several ppm. By the reformer, the shift converter, and the selective oxidizer, the fuel gas whose hydrogen concentration was about 75% was supplied from the hydrogen generator to the polymer electrolyte fuel cell at a rate (dry gas basis) of 19 liters per minute. At this time, the fuel gas just after being discharged from the fuel gas outlet port of the hydrogen generator had a temperature of about 100° C. and an average dew point of 56° C. It was observed that the dew point of the fuel gas generated in the hydrogen generator changed in a range of about ±5° C. due to changes of the combustion heat of the off gas and changes of the supply amount of water used to cause the steam-reforming reaction to proceed. Further, in the present verification, used as the total enthalpy heat exchanger which humidified the oxidizing gas was a hollow fiber membrane total enthalpy heat exchanger, produced by Perma Pure LLC in the U.S., which used a perfluoro sulfonic acid membrane similar to a membrane used in an MEA as a moisture permeable membrane. The total area of the perfluoro sulfonic acid membrane in the hollow fiber membrane total enthalpy heat exchanger was about 0.8 m$^2$. An enthalpy efficiency of the hollow fiber membrane total enthalpy heat exchanger was about 73%. In a rated operation, the hollow fiber membrane total enthalpy heat exchanger could generate the oxidizing gas having the dew point of 64° C. by using the off air discharged from the polymer electrolyte fuel cell.

Designed, produced, and used as the condensing and humidifying device which humidified the fuel gas was a condensing and humidifying device including: as the humidifying membrane, a Gore-Select 30 membrane produced by Japan Gore-Tex Inc.; and as the condensing plate or the like, a carbon separator, produced by Tokai Carbon Co., Ltd., similar to a membrane used in the polymer electrolyte fuel cell. The above-described humidifying membrane constituting the condensing and humidifying device had a material permeability coefficient of $1.0 \times 10^7$ (kg/s/Pa/m$^2$) and an effective area of 300 cm$^2$, and thereby an exchange capacity of 1.3 kcal per minute could be obtained. In a rated operation, the condensing and humidifying device could generate the fuel gas having the dew point of 64±2° C. from the fuel gas having the dew point of 56±5° C. generated in the hydrogen generator, by using the off gas discharged from the polymer electrolyte fuel cell.

Figure 4A:
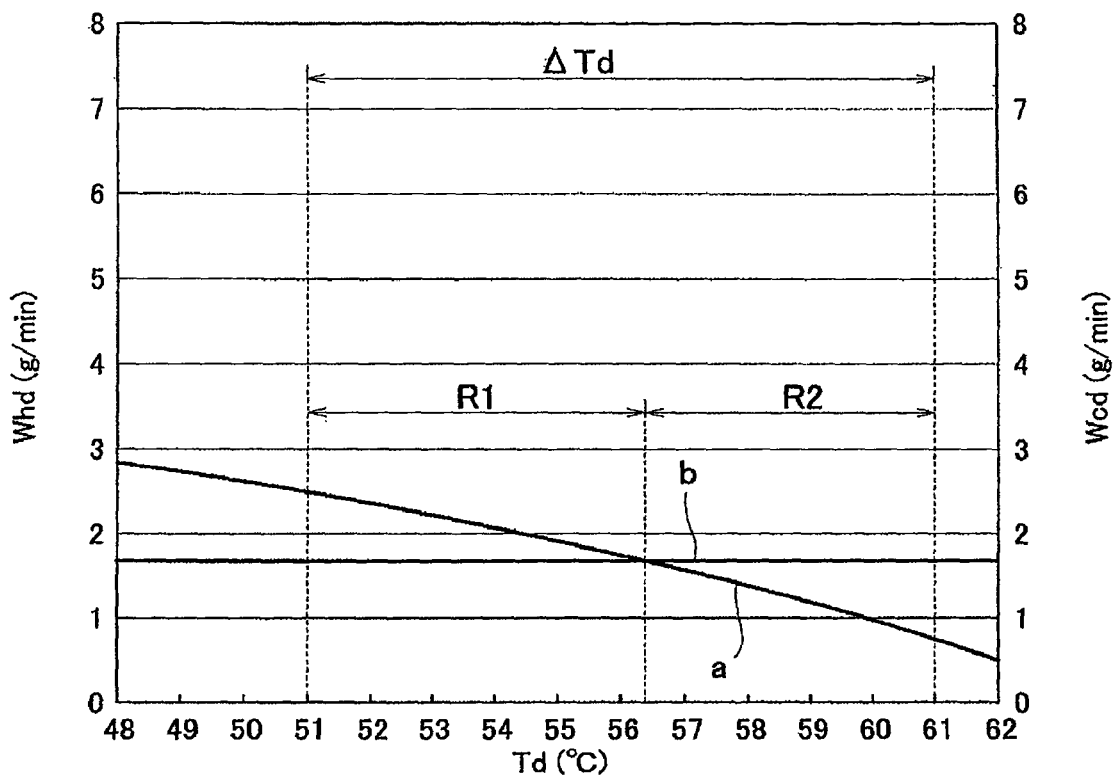
FIG. 4($a$) shows a correlation in a case where water available to optimize a dew point of a fuel gas is not increased in a condensing portion of the condensing and humidifying device.
Figure 4B:
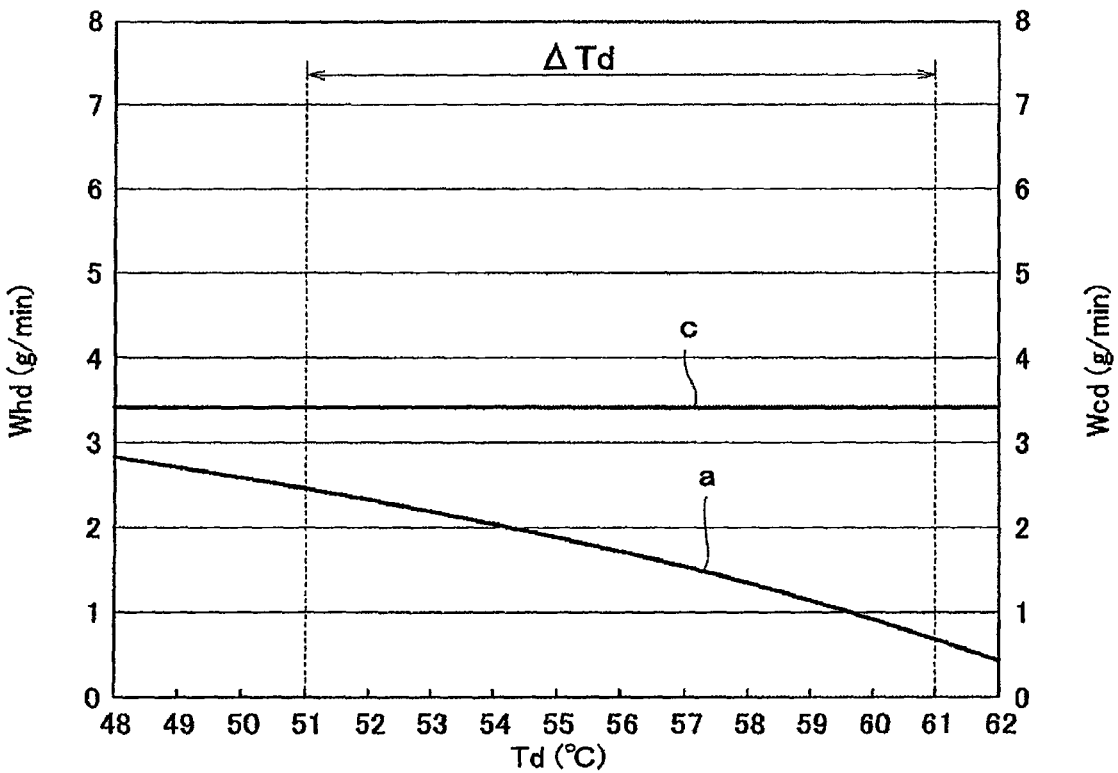

FIG. 4 are correlation diagrams schematically showing an interrelationship between the supply amount of water necessary to optimize the dew point of the fuel gas and the supply amount of water available to optimize the dew point of the fuel gas. FIG. 4(a) shows a correlation in a case where the water available to optimize the dew point of the fuel gas is not increased in the condensing portion of the condensing and humidifying device. FIG. 4(b) shows a correlation in a case where the water available to optimize the dew point of the fuel gas is increased in the condensing portion of the condensing and humidifying device.

In FIG. 4, a horizontal axis denotes the dew point of the fuel gas generated in the hydrogen generator. A left-side vertical axis denotes the supply amount of water necessary to optimize the dew point of the fuel gas. A right-side vertical axis denotes the supply amount of water available to optimize the dew point of the fuel gas.

Further, in FIG. 4, a curved line a denotes a change in the supply amount of water necessary to optimize the dew point of the fuel gas. A straight line b denotes a change in the supply amount of water available to optimize the dew point of the fuel gas in a case where the water is not increased in the condensing portion of the condensing and humidifying device. A straight line c denotes a change in the supply amount of water available to optimize the dew point of the fuel gas in a case where the water is increased in the condensing portion of the condensing and humidifying device.

As shown in FIGS. 4(a) and 4(b), the dew point of the fuel gas discharged from the fuel gas outlet port of the hydrogen generator changed in a dew point range ΔTd of 56±5° C. In this case, as shown in FIG. 4(a), the supply amount of water necessary to optimize the dew point of the fuel gas was large when the dew point of the fuel gas was low. In contrast, the supply amount of water necessary to optimize the dew point of the fuel gas was small when the dew point of the fuel gas was high. For example, when the dew point of the fuel gas was 51° C., the supply amount of water necessary to optimize the dew point of the fuel gas was about 2.5 g per minute. Moreover, when the dew point of the fuel gas was 61° C., the supply amount of water necessary to optimize the dew point of the fuel gas was about 0.7 g per minute.

As shown in FIG. 4(a), in a case where the water available to optimize the dew point of the fuel gas was not increased in the condensing portion of the condensing and humidifying device, the supply amount of water available to optimize the dew point of the fuel gas was, in some cases, smaller than the supply amount of water necessary to optimize the dew point of the fuel gas when the dew point of the fuel gas was in a range of a region R1. In this case, since the water available to optimize the dew point of the fuel gas lacked in some cases, the fuel gas having a predetermined dew point could not always be supplied to the polymer electrolyte fuel cell in the electric power generating operation of the fuel cell system. As shown in FIG. 4(a), when the dew point of the fuel gas was in a range of a region R2, the supply amount of water available to optimize the dew point of the fuel gas was larger than the supply amount of water necessary to optimize the dew point of the fuel gas. Therefore, the water available to optimize the dew point of the fuel gas did not lack. On this account, in the electric power generating operation of the fuel cell system, the fuel gas having a predetermined dew point could always be supplied to the polymer electrolyte fuel cell.

However, as shown in FIG. 4(b), in a case where the water available to optimize the dew point of the fuel gas was increased in the condensing portion of the condensing and humidifying device, the supply amount of water available to optimize the dew point of the fuel gas was always larger in the entire dew point range ΔTd than the supply amount of water necessary to optimize the dew point of the fuel gas. Therefore, the water available to optimize the dew point of the fuel gas did not lack in the electric power generating operation of the fuel cell system. On this account, the fuel gas having a predetermined dew point could always be supplied to the polymer electrolyte fuel cell in the electric power generating operation of the fuel cell system.

The fuel cell system carried out the electric power generating operation for 5,000 hours in a row. In this case, an average voltage drop rate of the cell constituting the polymer electrolyte fuel cell was 5 mV per 1,000 hours in a case where the water available to optimize the dew point of the fuel gas was not increased whereas the average voltage drop rate of the cell was 2 mV per 1,000 hours in a case where the water available to optimize the dew point of the fuel gas was increased. Therefore, it was confirmed that it was possible to provide a durable, reliable, and cheap fuel cell system capable of adequately and surely humidifying the fuel gas, supplied to the polymer electrolyte fuel cell, by a simple configuration using the humidifier.

Embodiment 2

In Embodiment 2 of the present invention, the secondary cooling water flowing through the secondary cooling water supplying and discharging system is utilized as the cooling medium to forcibly cool down in the condenser the off gas discharged from the polymer electrolyte fuel cell. Thus, the water available to humidify the fuel gas is forcibly increased.

Figure 5:
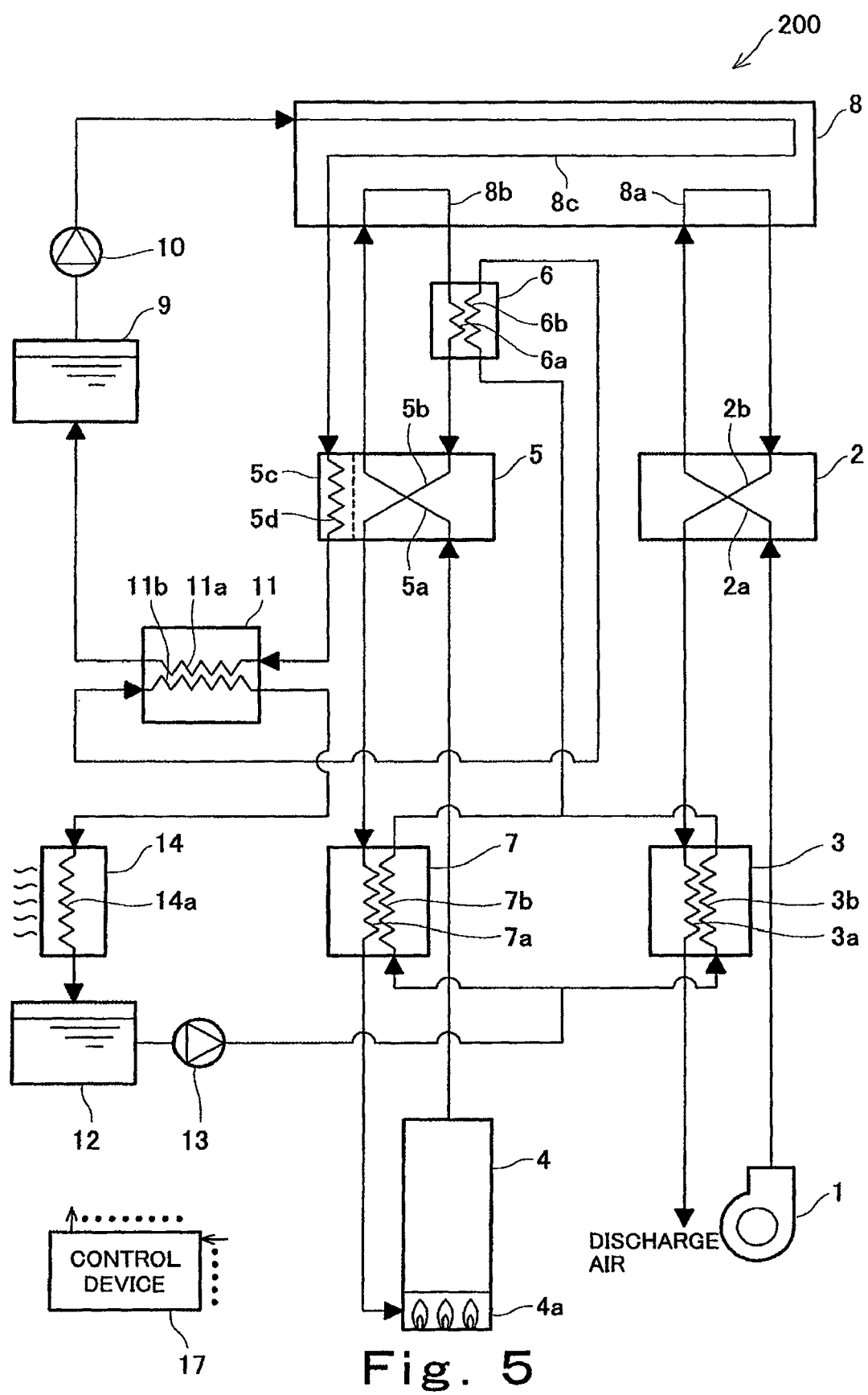
FIG. 5 is a block diagram schematically showing a part of the configuration of the fuel cell system according to Embodiment 2 of the present invention.

FIG. 5 is a block diagram schematically showing a part of the configuration of the fuel cell system according to Embodiment 2 of the present invention. In FIG. 5, each of solid lines having arrows denotes a connection state between components in the fuel cell system and a flow direction of the fuel gas, the oxidizing gas, the primary cooling water, or the secondary cooling water in the electric power generating operation.

As shown in FIG. 5, a fuel cell system 200 according to Embodiment 2 of the present invention is different in configuration from the fuel cell system 100 according to Embodiment 1 only in that: the outlet port of the pump 10 and the first end of the primary cooling water passage 8c of the polymer electrolyte fuel cell 8 are connected to each other by a predetermined pipe; the second end of the secondary cooling water passage 3b of the condenser 3 and the second end of the secondary cooling water passage 7b of the condenser 7 are connected to the first end of the primary cooling water passage 6b of the condenser 6 by a predetermined pipe; and the second end of the primary cooling water passage 6b and the first end of the secondary cooling water passage 11b of the heat exchanger 11 are connected to each other by a predetermined pipe. Other than these, the fuel cell system 200 is the same in configuration as the fuel cell system 100.

In the fuel cell system 200, the secondary cooling water discharged from the secondary cooling water passage 3b of the condenser 3 and the secondary cooling water passage 7b of the condenser 7 is supplied to the primary cooling water passage 6b of the condenser 6. Meanwhile, the off gas discharged from the fuel gas passage 8b of the polymer electrolyte fuel cell 8 is supplied to the off gas passage 6a of the condenser 6. The secondary cooling water supplied to the primary cooling water passage 6b of the condenser 6 is used as the cooling medium to forcibly cool down in the off gas passage 8a of the condenser 6 the off gas discharged from the fuel gas passage 8b of the polymer electrolyte fuel cell 8. Thus, the water available to humidify the fuel gas is forcibly increased. After the secondary cooling water used to cool down the off gas in the condenser 6 is discharged from the primary cooling water passage 6b, it is supplied to the secondary cooling water passage 11b of the heat exchanger 11. Other than these, operations of the fuel cell system 200 are the same as those of the fuel cell system 100.

Also in the case of the fuel cell system according to the present embodiment, even when the dew point of the fuel gas generated in the hydrogen generator is lowered, the steam contained in the off gas is forcibly converted into the condensed water by the condenser in the electric power generating operation. Therefore, the water available to humidify the fuel gas does not lack.

Example 2

Effects obtained by the present invention were verified by using the fuel cell system including the block configuration shown in FIG. 5 and the condensing and humidifying device shown in FIGS. 2 and 3.

Used in the present verification was an in-car polymer electrolyte fuel cell whose rated output power was 100 kw. The number of stacked cells of the polymer electrolyte fuel cell was 400. An electrode surface area of the polymer electrolyte fuel cell was 500 $cm^2$. When the fuel gas and the oxidizing gas were supplied to the polymer electrolyte fuel cell, the fuel utilization ratio (Uf) was 75%, the oxygen utilization ratio (Uo) was 50%, and a load whose load current was 375 A (current density was 0.75 $A/cm^2$) was connected to the polymer electrolyte fuel cell, the output voltage of 335V (average cell voltage of 0.67 V) and the output power of about 100 kw were obtained.

In Example 2, the primary cooling water supplying and discharging system and the secondary cooling water supplying and discharging system were controlled by a predetermined control device such that the temperature of the primary cooling water supplied to the primary cooling water passage of the polymer electrolyte fuel cell became 70° C. and the temperature of the primary cooling water discharged from the primary cooling water passage of the polymer electrolyte fuel cell at the time of maximum load became 82° C. At this time, the primary cooling water was supplied to the primary cooling water passage of the polymer electrolyte fuel cell at a rate of 150 liters per minute (at a maximum).

Since, actually, the polymer electrolyte fuel cell was operated by a load that is not more than 30% of the rated output power, and the load changed over time, the supply temperature of the primary cooling water changed largely in a temperature range of 70±3° C. and did not become a constant value. In contrast, the temperature of the secondary cooling water was stable at about 60° C. due to sequential heat radiation by the heat radiator. Especially, the temperature of the secondary cooling water introduced to the condenser 6 via the condenser 3 and the condenser 7 did not exceed 65° C. at all times. Therefore, when cooling down the off gas discharged from the polymer electrolyte fuel cell 8, supplying the secondary cooling water to the condenser 6 explained in the present embodiment is thought to be more rational than supplying the primary cooling water to the condenser 6 explained in Embodiment 1.

Moreover, in the present verification, used as the hydrogen generator was a hydrogen generator of a type which used as the heat source the combustion heat of the off gas discharged from the polymer electrolyte fuel cell. The hydrogen generator included the reformer, the shift converter, and the selective oxidizer. The reformer caused the steam-reforming reaction to proceed by catalysis of the platinum catalyst by using methanol as the raw material, thereby generating the fuel gas containing hydrogen. In the present verification, the fuel gas was generated such that the temperature of the platinum catalyst was controlled to be 280° C. and the S/C was controlled to be 3.1. As a result, the fuel gas was generated, whose dew point was in a range of 62±4° C.

It was found that in the fuel cell system, the off gas discharged from the polymer electrolyte fuel cell in the electric power generating operation was the two-layer fluid and the actual dew point of the off gas was changing over time in a range of 81° C. to 87° C.

Figure 6A:
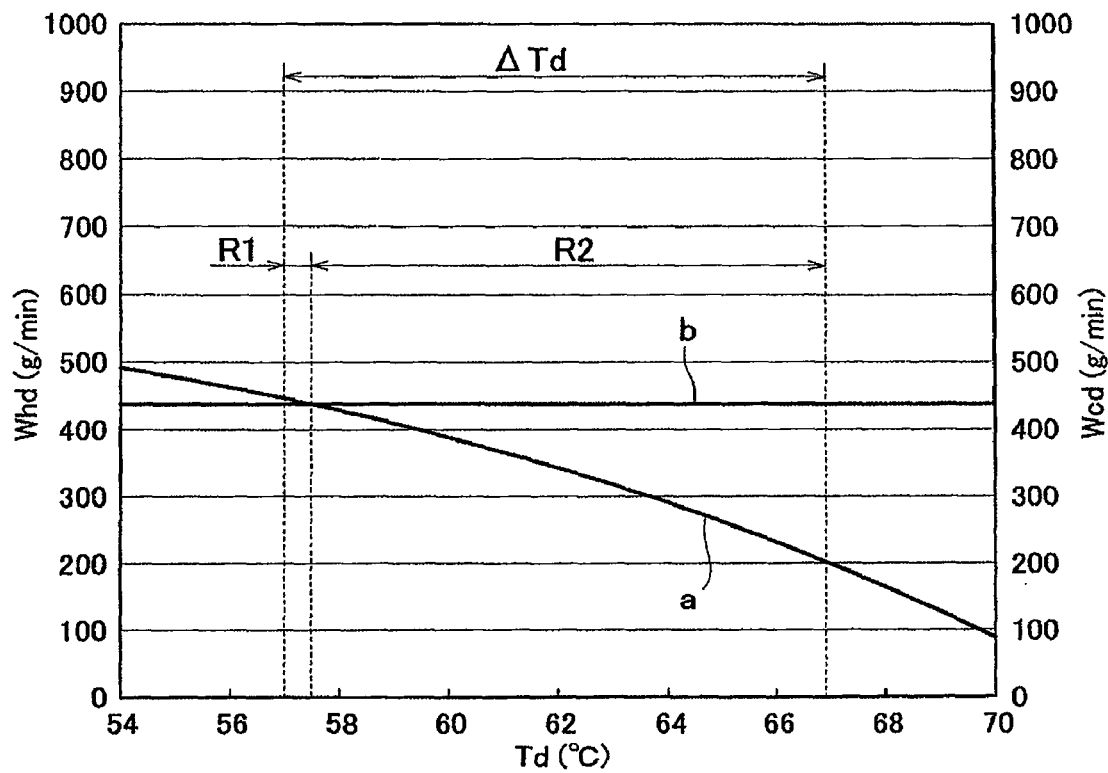
FIG. 6($a$) shows a correlation in a case where the water available to optimize the dew point of the fuel gas is not increased in the condensing portion of the condensing and humidifying device.
Figure 6B:
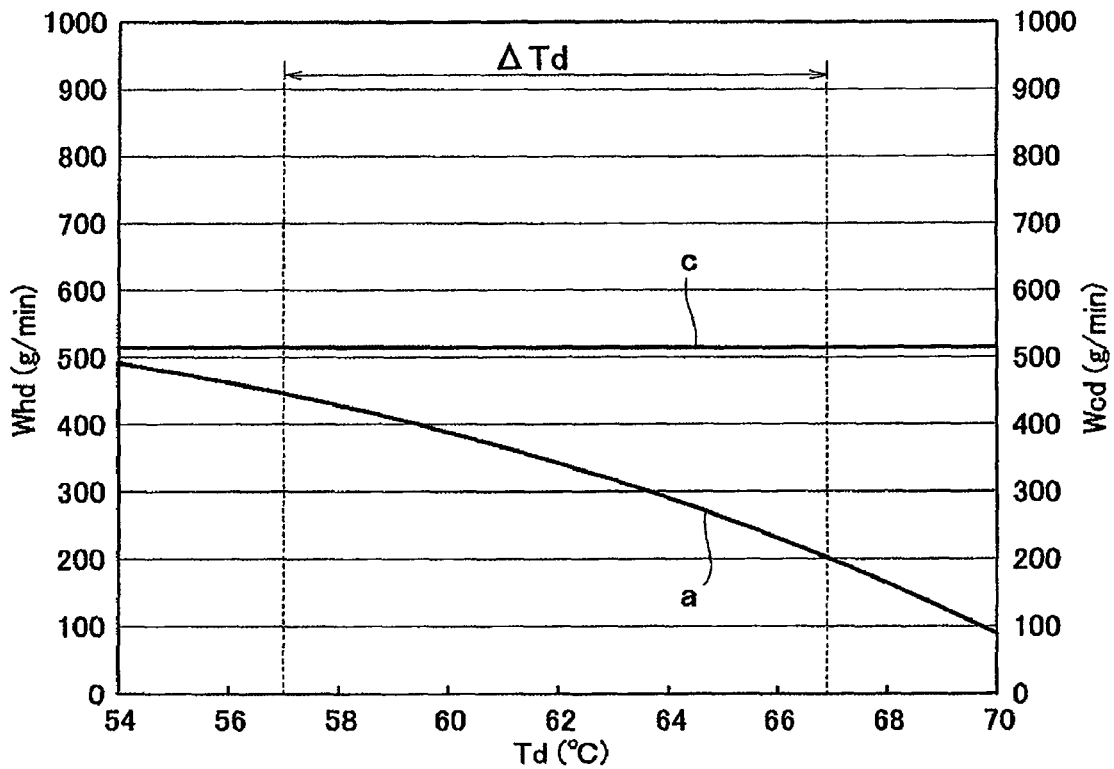

FIG. 6 are correlation diagrams schematically showing an interrelationship between the supply amount of water necessary to optimize the dew point of the fuel gas and the supply amount of water available to optimize the dew point of the fuel gas. FIG. 6(a) shows a correlation in a case where the water available to optimize the dew point of the fuel gas is not increased in the condensing portion of the condensing and humidifying device. FIG. 6(b) shows a correlation in a case where the water available to optimize the dew point of the fuel gas is increased in the condensing portion of the condensing and humidifying device.

In FIG. 6, a horizontal axis denotes the dew point of the fuel gas generated in the hydrogen generator. A left-side vertical axis denotes the supply amount of water necessary to optimize the dew point of the fuel gas. A right-side vertical axis denotes the supply amount of water available to optimize the dew point of the fuel gas.

Further, in FIG. 6, a curved line a denotes a change in the supply amount of water necessary to optimize the dew point of the fuel gas. A straight line b denotes a change in the supply amount of water available to optimize the dew point of the fuel gas in a case where the water is not increased in the condensing portion of the condensing and humidifying device. A straight line c denotes a change in the supply amount of water available to optimize the dew point of the fuel gas in a case where the water is increased in the condensing portion of the condensing and humidifying device.

As shown in FIGS. 6(a) and 6(b), the dew point of the fuel gas discharged from the fuel gas outlet port of the hydrogen generator changed in the dew point range ΔTd of about 57° C. to 67° C. As shown in FIG. 6(a), in a case where the water available to optimize the dew point of the fuel gas was not increased in the condensing portion of the condensing and humidifying device, the supply amount of water available to optimize the dew point of the fuel gas was, in some cases, smaller than the supply amount of water necessary to optimize the dew point of the fuel gas when the dew point of the fuel gas was in a range of the region R1. As shown in FIG. 6(a), when the dew point of the fuel gas was in a range of the region R2, the supply amount of water available to optimize the dew point of the fuel gas was larger than the supply amount of water necessary to optimize the dew point of the fuel gas.

However, as shown in FIG. 6(b), when the water available to optimize the dew point of the fuel gas was increased in the condensing portion of the condensing and humidifying device, the supply amount of water available to optimize the dew point of the fuel gas was always larger in the entire dew point range ΔTd than the supply amount of water necessary to optimize the dew point of the fuel gas. Therefore, the water available to optimize the dew point of the fuel gas did not lack in the electric power generating operation of the fuel cell system. On this account, the fuel gas having a predetermined dew point could always be supplied to the polymer electrolyte fuel cell in the electric power generating operation of the fuel cell system.

The fuel cell system continuously carried out the electric power generating operation. In this case, the dew point of the fuel gas supplied to the polymer electrolyte fuel cell was in a range of about 72±2° C. under various possible load conditions of an in-vehicle fuel cell system. The average voltage drop rate of the cell was a satisfactory voltage drop rate similar to Example 1 of Embodiment 1.

Embodiment 3

In Embodiment 3 of the present invention, air supplied by a second blower from an outside of the fuel cell system is utilized as the cooling medium to forcibly cool down in the condenser the off gas discharged from the polymer electrolyte fuel cell. Thus, the water available to humidify the fuel gas is forcibly increased.

Figure 7:
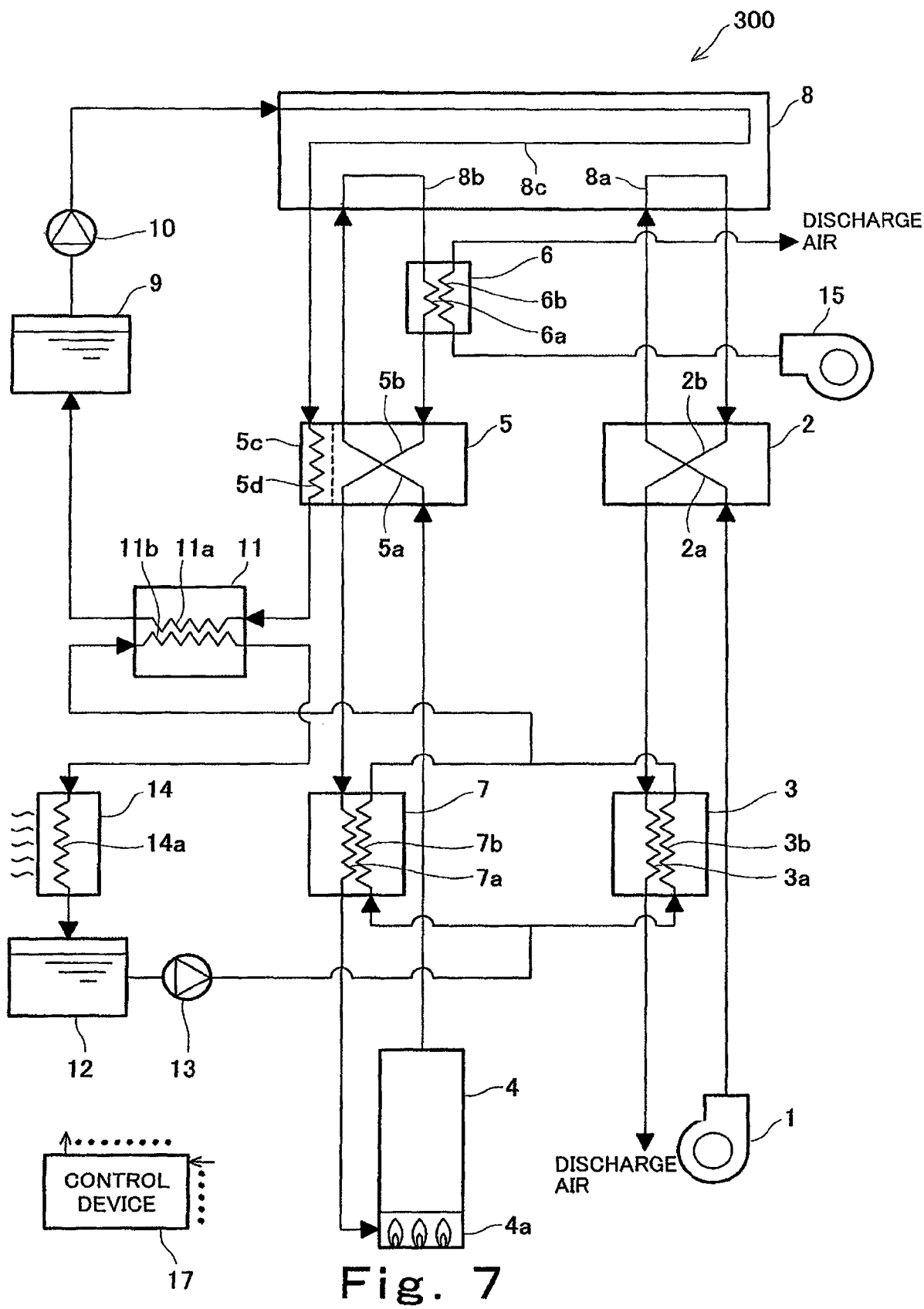
FIG. 7 is a block diagram schematically showing a part of the configuration of the fuel cell system according to Embodiment 3 of the present invention.

FIG. 7 is a block diagram schematically showing a part of the configuration of the fuel cell system according to Embodiment 3 of the present invention. In FIG. 7, each of solid lines having arrows denotes a connection state between components in the fuel cell system and a flow direction of the fuel gas, the oxidizing gas, the primary cooling water, or the secondary cooling water in the electric power generating operation.

As shown in FIG. 7, a fuel cell system 300 according to Embodiment 3 of the present invention is different in configuration from the fuel cell system 100 according to Embodiment 1 only in that: the outlet port of the pump 10 and the first end of the primary cooling water passage 8c of the polymer electrolyte fuel cell 8 are connected to each other by a predetermined pipe; an air outlet port of a second blower 15 and the first end of the primary cooling water passage 6b of the condenser 6 are connected to each other by a predetermined pipe; and the second end of the primary cooling water passage 6b is connected to a first end of a predetermined pipe having an opening end. Other than these, the fuel cell system 300 is the same in configuration as the fuel cell system 100.

In the fuel cell system 300, air discharged from the outlet port of the second blower 15 is supplied to the primary cooling water passage 6b of the condenser 6. Meanwhile, the off gas discharged from the fuel gas passage 8b of the polymer electrolyte fuel cell 8 is supplied to the off gas passage 6a of the condenser 6. The air supplied to the primary cooling water passage 6b of the condenser 6 is used as the cooling medium to forcibly cool down in the off gas passage 8a of the condenser 6 the off gas discharged from the fuel gas passage 8b of the polymer electrolyte fuel cell 8. Thus, the water available to humidify the fuel gas is forcibly increased. After the air used to cool down the off gas in the condenser 6 is discharged from the primary cooling water passage 6b, it is discharged toward an outside of the fuel cell system 300. Other than these, operations of the fuel cell system 300 are the same as those of the fuel cell system 100.

Also in the case of the fuel cell system according to the present embodiment, even when the dew point of the fuel gas generated in the hydrogen generator is lowered, the steam contained in the off gas is forcibly converted into the condensed water by the condenser in the electric power generating operation. Therefore, the water available to humidify the fuel gas does not lack.

Embodiment 4

In Embodiment 4 of the present invention, air existing in the fuel cell system is utilized as the cooling medium to forcibly cool down in the condenser the off gas discharged from the polymer electrolyte fuel cell. Thus, the water available to humidify the fuel gas is forcibly increased.

Figure 8:
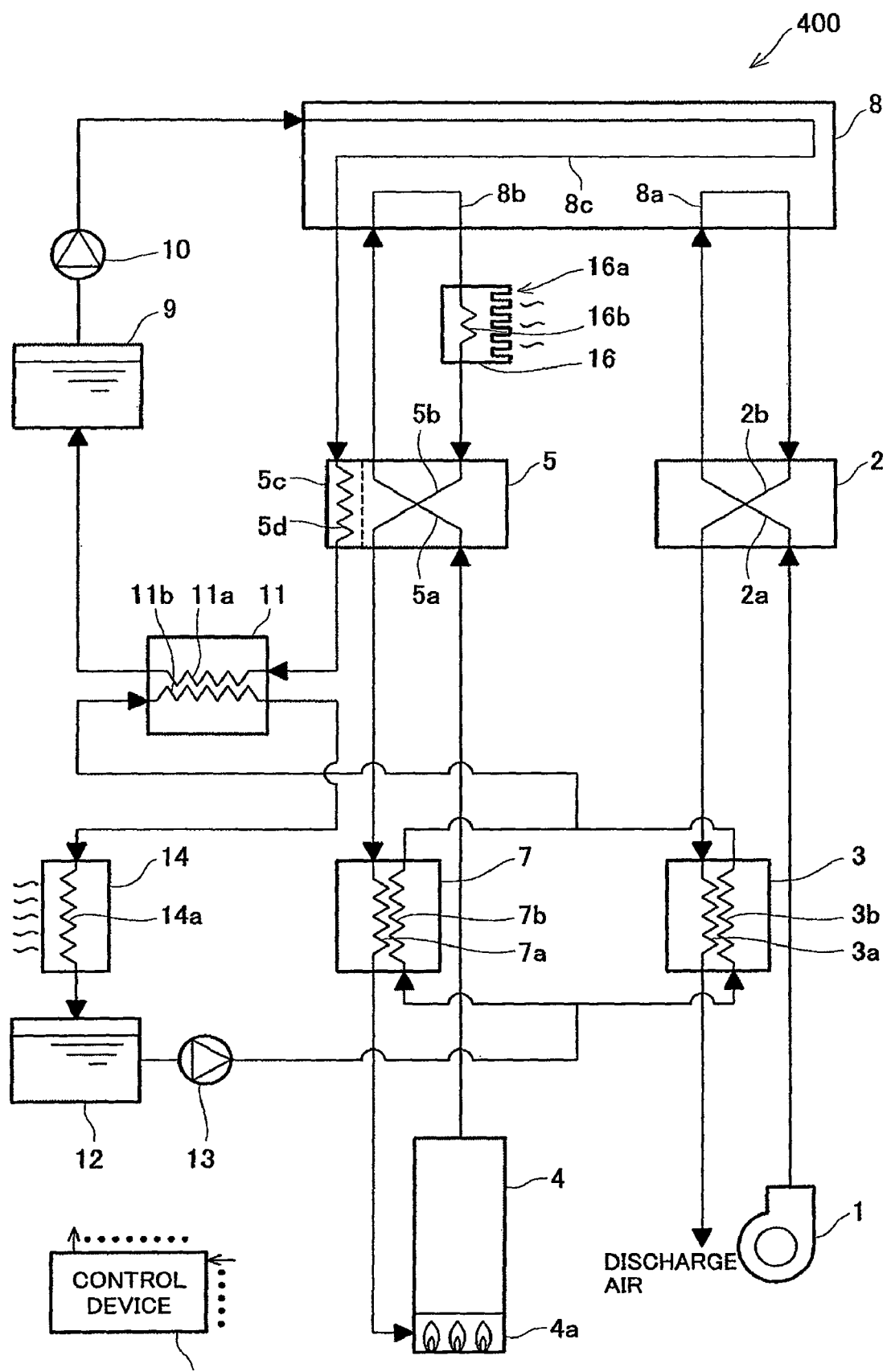
FIG. 8 is a block diagram schematically showing a part of the configuration of the fuel cell system according to Embodiment 4 of the present invention.
Figure 9:
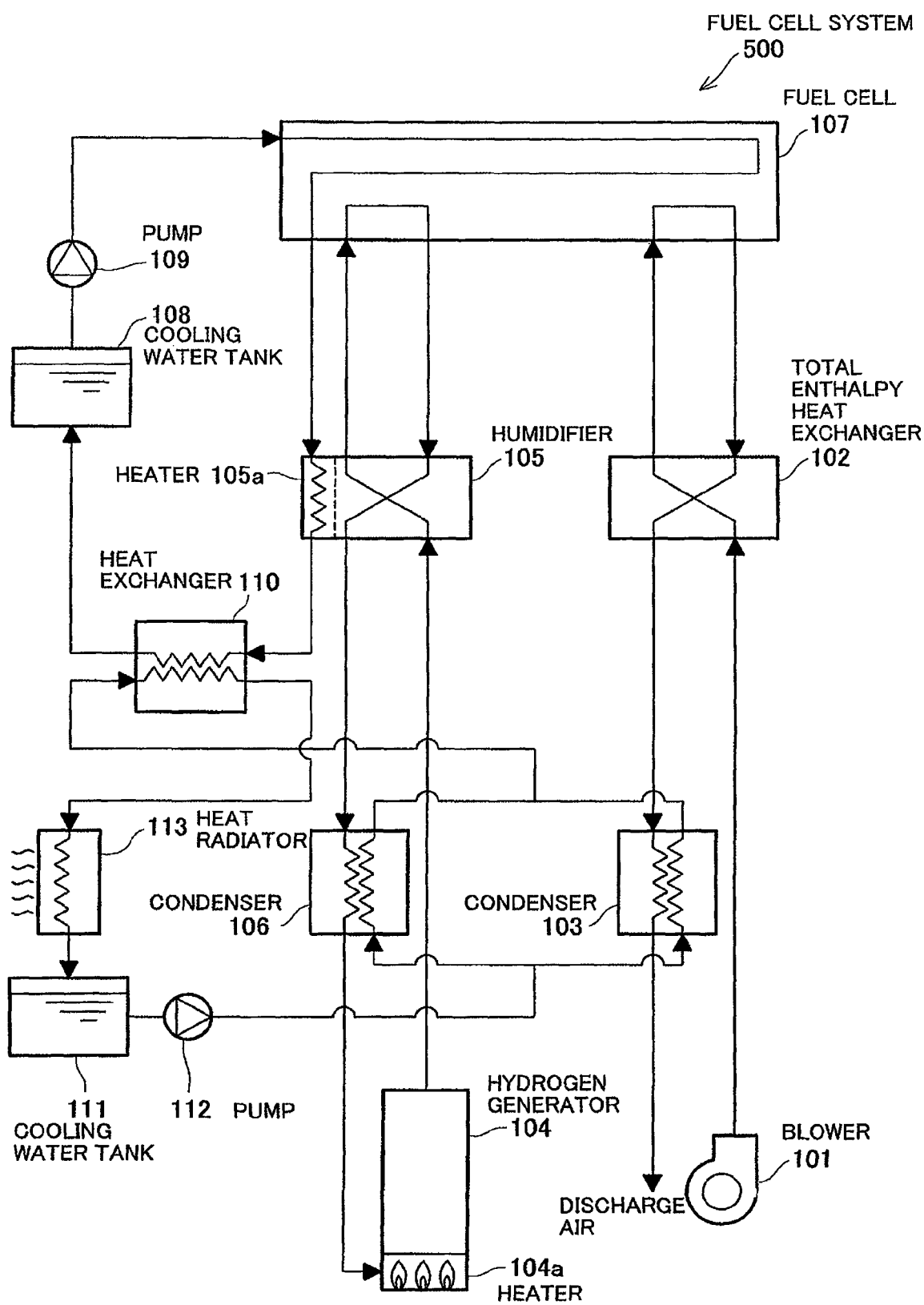
FIG. 9 is a block diagram schematically showing a part of a typical configuration of a conventional stationary power generating fuel cell system which humidifies the fuel gas using, as a heat source, cooling water discharged from a fuel cell and increased in temperature.

FIG. 8 is a block diagram schematically showing a part of the configuration of the fuel cell system according to Embodiment 4 of the present invention. In FIG. 8, each of solid lines having arrows denotes a connection state between components in the fuel cell system and a flow direction of the fuel gas, the oxidizing gas, the primary cooling water, or the secondary cooling water in the electric power generating operation.

As shown in FIG. 8, a fuel cell system 400 according to Embodiment 4 of the present invention is different in configuration from the fuel cell system 100 according to Embodiment 1 only in that: the outlet port of the pump 10 and the first end of the primary cooling water passage 8c of the polymer electrolyte fuel cell 8 are connected to each other by a predetermined pipe; and a condenser 16 including a heat radiating fin 16a and an off gas passage 16b are disposed instead of the condenser 6 shown in FIG. 1 for example. Other than these, the fuel cell system 400 is the same in configuration as the fuel cell system 100.

In the fuel cell system 400, the off gas discharged from the fuel gas passage 8b of the polymer electrolyte fuel cell 8 is supplied to the off gas passage 16b of the condenser 16. By a heat radiating action of the heat radiating fin 16a of the condenser 16, the off gas discharged from the fuel gas passage 8b of the polymer electrolyte fuel cell 8 is forcibly cooled down in the off gas passage 16b of the condenser 16. Thus, the water available to humidify the fuel gas is forcibly increased.

Other than these, operations of the fuel cell system 400 are the same as those of the fuel cell system 100.

Also in the case of the fuel cell system according to the present embodiment, even when the dew point of the fuel gas generated in the hydrogen generator is lowered, the steam contained in the off gas is forcibly converted into the condensed water by the condenser in the electric power generating operation. Therefore, the water available to humidify the fuel gas does not lack. In addition, the water available to humidify the fuel gas can be increased by a further simpler configuration than the configurations of Embodiments 1 to 3.

In the present embodiment, the condenser 16 includes the heat radiating fin 16a and the off gas passage 16b. However, the present embodiment is not limited to this. For example, instead of the condenser 16, only an off gas passage (off gas pipe) corresponding to the off gas passage 16b may be disposed between the first end of the fuel gas passage 8b of the polymer electrolyte fuel cell 8 and the first end of the outward route 5b of the humidifier 5. Even in a case where the off gas passage itself corresponding to the off gas passage 16b functions as the condenser, the off gas is forcibly cooled down in the off gas passage by the heat radiating action of the off gas passage. Thus, as with the present embodiment, the water available to humidify the fuel gas is forcibly increased.

In this case, the shape, arrangement, and the like of the off gas passage are not especially limited. For example, in a modification example of the above-described present embodiment, the off gas passage may have a linear shape, or the off gas passage may have a spiral shape. Further, in the above-described modification example, the off gas passage may be simply exposed. To be specific, the shape (diameter, length, number of turns, etc.), material (carbon, stainless steel, etc.), arrangement (exposure, existence of a heat insulator, type of the heat insulator, etc.) and the like of the off gas passage are appropriately set in accordance with the configuration of the fuel cell system and the like as long as the effects of the present application can be obtained. With this, the water available to humidify the fuel gas can be forcibly increased without disposing the condenser 16. With this configuration, the water available to humidify the fuel gas can be increased by a further simpler configuration than the configurations of Embodiments 1 to 3.

As the cooling medium which forcibly cools down the off gas, the primary cooling water, the secondary cooling water, the air outside the fuel cell system, or the air inside the fuel cell system may be suitably selected in accordance with a mode of supplying the fuel gas, a use application of the fuel cell system, and the like. Examples of the mode of supplying the fuel gas are a mode of supplying the fuel gas from a bomb assuming that a bone dry gas is used, a mode of supplying the fuel gas which is automatically humidified up to a certain degree, and the like. Moreover, examples of the use application of the fuel cell system are a stationary use application, an in-car use application, and the like.

Moreover, it is preferable that in the case of carrying out a comparatively small amount of additional humidification especially assuming that the steam reforming process is used, the air inside the fuel cell system be used as the cooling medium, or the primary cooling water flowing through the primary cooling water supplying and discharging system be used as the cooling medium. Even with this, the water available to humidify the fuel gas can be adequately increased.

INDUSTRIAL APPLICABILITY

The fuel cell system according to the present invention has an industrial applicability as a durable, reliable, and cheap fuel cell system capable of adequately and surely humidifying a fuel gas, supplied to a polymer electrolyte fuel cell, by a simple configuration using a humidifier without disposing a particular exclusive auxiliary device.

The invention claimed is:

1. A fuel cell system comprising at least:
   a hydrogen generator which is supplied with a raw material to generate a fuel gas containing hydrogen;
   a humidifier which is supplied with the fuel gas, generated in said hydrogen generator, to humidify the fuel gas by utilizing heat energy and an off gas separately supplied thereto; and
   a fuel cell which is supplied with the fuel gas humidified in said humidifier and an oxidizing gas to generate electric power while discharging the heat energy and the off gas,
   the fuel cell system further comprising a condenser which converts steam of the off gas, discharged from said fuel cell, into condensed water by cooling down the steam by heat exchange with a cooling medium, and supplies the condensed water to said humidifier to humidify the fuel gas,
   wherein said off gas utilized by the humidifier includes fuel gas discharged from the fuel cell.

2. The fuel cell system according to claim 1, further comprising a primary cooling water supplying and discharging system which causes primary cooling water to flow through an inside of said fuel cell to directly control a temperature of said fuel cell,
   the fuel cell system being configured to use as the cooling medium the primary cooling water in said primary cooling water supplying and discharging system.

3. The fuel cell system according to claim 1, further comprising a secondary cooling water supplying and discharging system which causes primary cooling water of said primary cooling water supplying and discharging system to transfer heat to secondary cooling water to indirectly control a temperature of said fuel cell,
   the fuel cell system being configured to use as the cooling medium the secondary cooling water in said secondary cooling water supplying and discharging system.

4. The fuel cell system according to claim 1, further comprising an air introducing device which introduces air from an outside of the fuel cell system to an inside of the fuel cell system,
   the fuel cell system being configured to use as the cooling medium the air introduced to the inside of the fuel cell system by said air introducing device.

5. The fuel cell system according to claim 1, being configured to use air of an inside of the fuel cell system as the cooling medium.

6. The fuel cell system according to claim 1, being configured such that the condensed water is automatically supplied from said condenser toward said humidifier by gravitational force.

7. The fuel cell system according to claim 1, wherein said condenser and said humidifier are integrated with each other to constitute a condensing and humidifying device.

8. The fuel cell system according to claim 1, further comprising as said fuel cell a polymer electrolyte fuel cell which is supplied with the fuel gas and the oxidizing gas to generate the electric power.

* * * * *